(12) United States Patent
Biswas et al.

(10) Patent No.: US 11,385,177 B2
(45) Date of Patent: Jul. 12, 2022

(54) DESIGNS OF ACCURATE PM SENSORS AND SYSTEMS FOR LABORATORY AND REAL TIME CALIBRATION / DATA INVERSION

(71) Applicant: Washington University, St. Louis, MO (US)

(72) Inventors: Pratim Biswas, St. Louis, MO (US); Jiayu Li, St. Louis, MO (US)

(73) Assignee: Washington University, St. Louis, MO (US)

( * ) Notice: Subject to any disclaimer, the term of this patent is extended or adjusted under 35 U.S.C. 154(b) by 761 days.

(21) Appl. No.: 16/383,385

(22) Filed: Apr. 12, 2019

(65) Prior Publication Data

US 2019/0317019 A1 Oct. 17, 2019

Related U.S. Application Data

(60) Provisional application No. 62/657,386, filed on Apr. 13, 2018.

(51) Int. Cl.
*G01N 21/53* (2006.01)
*G01N 1/22* (2006.01)
*G01N 21/27* (2006.01)

(52) U.S. Cl.
CPC ......... *G01N 21/532* (2013.01); *G01N 1/2202* (2013.01); *G01N 21/274* (2013.01); *G01N 2001/2223* (2013.01)

(58) Field of Classification Search
CPC .. G01N 21/532; G01N 1/2202; G01N 21/274; G01N 2001/2223; G01N 2015/0046; G01N 15/06; G01N 2015/0693
See application file for complete search history.

(56) References Cited

U.S. PATENT DOCUMENTS

| | | | |
|---|---|---|---|
| 7,057,724 B1 * | 6/2006 | Mead | G01N 21/47 356/343 |
| 10,404,775 B2 | 9/2019 | Seaton et al. | |

(Continued)

FOREIGN PATENT DOCUMENTS

| | | |
|---|---|---|
| CN | 208953410 U | 6/2019 |
| CN | 110261273 A | 9/2019 |

(Continued)

*Primary Examiner* — John R Schnurr
(74) *Attorney, Agent, or Firm* — Armstrong Teasdale LLP

(57) ABSTRACT

A sensor analysis computer device for analyzing particulate matter is provided. The computer device includes at least one memory and at least one processor in communication with the at least one memory. The computer device is in communication with a sensor configured to measure particulate matter. The at least one processor is programmed to store a plurality of parameter data for the sensor including a calibration factor, receive a plurality of sensor data from the sensor, determine a present calibration factor based on the plurality of parameter data and the plurality of sensor data, determine an updated calibration factor for the sensor based on the present calibration factor and the plurality of parameter data, and transmit the updated calibration factor to the sensor, wherein the sensor is configured to adjust subsequent sensor data based on the updated calibration factor.

20 Claims, 18 Drawing Sheets

(56) References Cited

U.S. PATENT DOCUMENTS

| | | | | |
|---|---|---|---|---|
| 2008/0297791 | A1* | 12/2008 | Imura | G01J 3/28 |
| | | | | 356/306 |
| 2010/0007889 | A1* | 1/2010 | Van Kesteren | G01N 21/1702 |
| | | | | 356/432 |
| 2010/0315638 | A1* | 12/2010 | Goohs | G01N 15/0211 |
| | | | | 356/337 |
| 2015/0355084 | A1 | 12/2015 | White | |
| 2016/0216200 | A1* | 7/2016 | Mocnik | G01N 21/274 |
| 2018/0275052 | A1* | 9/2018 | Walsh | G01N 21/645 |
| 2019/0195769 | A1* | 6/2019 | McBrady | G01N 15/14 |
| 2019/0234862 | A1* | 8/2019 | Schladitz | G01N 21/49 |
| 2019/0283525 | A1* | 9/2019 | Dhake | G06V 20/59 |
| 2019/0346417 | A1 | 11/2019 | Benefield | |
| 2019/0383736 | A1 | 12/2019 | Caubel et al. | |
| 2020/0103328 | A1* | 4/2020 | Ozcan | G01N 15/0612 |

FOREIGN PATENT DOCUMENTS

| | | |
|---|---|---|
| CN | 110514225 A | 11/2019 |
| CN | 110514566 A | 11/2019 |
| WO | 2019204789 A1 | 10/2019 |
| WO | 2019210720 A1 | 11/2019 |

* cited by examiner

|  | Solution conc. mg cc$^{-1}$ | Test number | Particle density g cc$^{-1}$ | Size distributions from SMPS $d_{pg}$ | $\sigma_g$ |
|---|---|---|---|---|---|
| I. NaCl | 0.507 | 1 | 2.16 | 92.02 | 1.77 |
|  | 1.087* | 2 |  | 119.55 | 1.69 |
|  | 1.892 | 3 |  | 156.95 | 1.48 |
| II. Sucrose | 1.150 | 4 | 1.59 | 115.78 | 1.91 |
|  | 3.325 | 5 |  | 126.99 | 1.99 |
|  | 4.315 | 6 |  | 155.57 | 1.87 |
| III. SiO$_2$ | 1% | 7 | 2.32 | 150.93 | 2.07 |
|  | 2% | 8 |  | 176.06 | 1.91 |

FIGURE 4

| | Test number | Calculated scattered light intensity fitted equation Scattered light int. ($y$, UA) versus sensor output ($x$, UA) Equation | $R^2$ | Mass fitted equation (experimental data) Mass conc. ($y$, μg m⁻³) versus sensor output ($x$, UA) Equation | $R^2$ | Calibration factor ($K$) $K_{exp}$ from fitting | $K_{eq,6}$ from Eq. (6) | Error from Eq. (13) |
|---|---|---|---|---|---|---|---|---|
| I. NaCl | 1 | $y = 3.20 \times 10^{-16} x - 5.35 \times 10^{-14}$ | 0.978 | $y = 11.26(x - 146.98)$ | 0.951 | 11.26 | 8.42 | 25.22% |
| | 2 | $y = 2.58 \times 10^{-16} x - 3.73 \times 10^{-14}$ | 0.995 | $y = 7.03(x - 146.98)$ | 0.996 | 7.03 | 7.13 | NA |
| | 3 | $y = 3.26 \times 10^{-16} x - 4.24 \times 10^{-14}$ | 0.977 | $y = 12.74(x - 146.98)$ | 0.961 | 12.74 | 8.89 | 30.21% |
| II. Sucrose | 4 | $y = 2.16 \times 10^{-16} x - 3.08 \times 10^{-14}$ | 0.990 | $y = 3.75(x - 146.98)$ | 0.989 | 3.75 | 3.66 | 2.40% |
| | 5 | $y = 1.81 \times 10^{-16} x - 2.42 \times 10^{-14}$ | 0.996 | $y = 2.44(x - 146.98)$ | 0.993 | 2.44 | 3.43 | -40.57% |
| | 6 | $y = 2.39 \times 10^{-16} x - 3.43 \times 10^{-14}$ | 0.966 | $y = 3.04(x - 146.98)$ | 0.977 | 3.04 | 3.28 | -7.90% |
| III. SiO$_2$ | 7 | $y = 2.74 \times 10^{-16} x - 3.80 \times 10^{-14}$ | 0.984 | $y = 4.84(x - 146.98)$ | 0.996 | 4.84 | 5.56 | -4.91% |
| | 8 | $y = 2.56 \times 10^{-16} x - 3.66 \times 10^{-14}$ | 0.995 | $y = 5.30(x - 146.98)$ | 0.994 | 5.3 | 6.04 | -28.00% |

FIGURE 8

| | Refractive Index | $a$ (x $10^{-15}$) | $b$ (x $10^{-15}$) | $R^2$ |
|---|---|---|---|---|
| NaCl | 1.536 | 29.44 | 1.394 | 0.7508 |
| Sucrose | 1.5376 | 29.58 | 1.012 | 0.7344 |
| $SiO_2$ | 1.486 | 33.64 | 0.932 | 0.7313 |
| Element Carbon | 1.96-0.66i | 172.8 | 0.258 | 0.983 |
| $Fe_2O_3$ | 3.011 | 32.19 | 0.1582 | 0.7849 |
| $Al_2O_3$ | 1.765 | 25.27 | 0.447 | 0.8567 |

FIGURE 11

| | Refractive Index | Test number | $d_{pg}$ | $\sigma_g$ | $\rho_p$ | Equation | $K_{exp}$ from experiments | $K_{eq,12}$ from Eq. (12) | Error from Eq. (13) |
|---|---|---|---|---|---|---|---|---|---|
| I. NaCl | 1.536 | 1 | 92.02 | 1.77 | 2.16 | 12a | 11.26 | 8.04 | 28.6% |
| | | 2 | 119.55 | 1.69 | | | 7.03 | 7.27 | -3.4% |
| | | 3 | 156.95 | 1.48 | | | 12.74 | 16.60 | -30.3% |
| II. Sucrose | 1.5376 | 4 | 115.78 | 1.91 | 1.59 | 12b | 3.75 | 2.57 | 31.5% |
| | | 5 | 126.99 | 1.99 | | | 2.44 | 3.25 | -33.2% |
| | | 6 | 155.57 | 1.87 | | | 3.04 | 3.24 | -6.6% |
| III. SiO$_2$ | 1.486 | 7 | 150.93 | 2.07 | 2.32 | 12b | 4.84 | 7.51 | -41.7% |
| | | 8 | 176.06 | 1.91 | | | 5.3 | 6.64 | -40.7% |

FIGURE 12

DESIGNS OF ACCURATE PM SENSORS AND SYSTEMS FOR LABORATORY AND REAL TIME CALIBRATION / DATA INVERSION

CROSS-REFERENCE TO RELATED APPLICATIONS

This application claims the benefit of priority to U.S. Provisional Patent Application No. 62/657,386, filed Apr. 13, 2018, entitled "METHODS AND SYSTEMS FOR PARTICULATE MATTER SENSOR CALIBRATION," the entire contents and disclosure of which are hereby incorporated by reference in their entirety.

BACKGROUND OF THE INVENTION

The field of the invention relates generally to analysis of particulate matter (PM) output, more specifically to systems and methods for calibrating one or more particulate matter sensors for improved accuracy.

Particulate matter (PM) is ubiquitous in the environment and is receiving significant attention due to potential impacts on health. Outdoor PM pollution can be attributed to gasoline exhaust, diesel emissions, biomass burning, traffic-related pollutions, and industrial emissions. Indoor PM is generally emitted from tobacco smoking, cooking, wood burning, medical treatment, and outdoor PM penetration. Developing countries, such as India and China, have had to cope with a challenging situation due to the adverse effect of high PM level. For example, recent studies have indicated that ambient air pollution accounts for 1.6 million deaths every year in China and 4-6% of the Indian national burden of disease. Indoor PM pollution increases the potential risk for chronic obstructive pulmonary disease and acute respiratory infections. Most buildings have HVAC (heating, ventilation and air conditioner) systems that filter the air in the indoor environment. However, most systems do not take into account the concentration of pollutants indoors, which may fluctuate over time. By developing a real-time air quality monitoring system, the HVAC system can operate more efficiently. Therefore, distributed and real-time particle concentration measurements are necessary to identify hot-spots indoors and provide information for the HVAC system.

Since it is important to monitor PM concentrations, many instruments have been developed, ranging from accurate and expensive laboratory scale instruments to portable instruments for field measurements. Field and laboratory instruments that are compact typically rely on the measurement of the optical scattering intensity of particles. The governing principles of these instruments can be divided into either single particle light scattering measurements or total particle light scattering measurements; and they report either the number or the mass concentration, respectively. Portable instruments sacrifice some accuracy, but they are more convenient and practical for field measurements.

While several portable instruments are available, cost is still the major concern for deploying such real-time monitoring network systems for indoor and outdoor air quality measurements. Recently, a series of low-cost particle sensors that operate by measuring the total particle light scattering intensity are being touted for use. Their low price (device cost in the range of 10 USD each) alleviates the economic concerns in making widespread measurements in large-scale environments, and their compact size makes them readily portable. These units could be assembled for a total cost of 50 USD and used in a distributed manner. In controlled laboratory tests, low-cost particle sensors have shown high linearity and stability in comparison with commercial instruments with a known particle size and composition. Several studies in the literature have reported the combination of low-cost particle sensors with "smart" home devices (e.g., temperature, humidity, carbon monoxide sensors, cameras) to provide more comfortable and energy-efficient homes and workplaces. Moreover, a few studies also applied multiple sensors for outdoor or indoor air quality measurements. One of the disadvantage is that the response of the low-cost particle sensors varies with particle composition and size distributions, which requires repeated calibration to ensure reliable estimations of mass concentration. However, there is no sufficient study of the reasons and quantification for such variations; nor approaches proposed to enhance the accuracy.

BRIEF DESCRIPTION

In one aspect, a sensor analysis computer device for analyzing particulate matter is provided. The computer device includes at least one memory and at least one processor in communication with the at least one memory. The computer device is in communication with a sensor configured to measure particulate matter. The at least one processor is programmed to store a plurality of parameter data for the sensor including a calibration factor. The at least one processor is also programmed to receive a plurality of sensor data from the sensor. The at least one processor is further programmed to determine a present calibration factor based on the plurality of parameter data and the plurality of sensor data. In addition, the at least one processor is programmed to determine an updated calibration factor for the sensor based on the present calibration factor and the plurality of parameter data. Moreover, the at least one processor is programmed to transmit the updated calibration factor to the sensor, wherein the sensor is configured to adjust subsequent sensor data based on the updated calibration factor.

In another aspect a system for analyzing particulate matter is provided. The system includes a plurality of sensors configured to measure particulate matter and a sensor analysis computer device in communication with the plurality of sensors. The computer device includes at least one memory and at least one processor in communication with the at least one memory. The at least one processor is programmed to store a plurality of parameter data for the plurality of sensors including a calibration factor for each sensor of the plurality of sensor. The at least one processor is also programmed to receive a plurality of sensor data from the plurality of sensors. The at least one processor is further programmed to determine a plurality of correlations between the plurality of sensors based on the plurality of sensor data. In addition, the at least one processor is programmed to update at least one of the plurality of calibration factors based on the plurality of correlations.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4 illustrates a table of densities and size distribution parameters of the particles generated from different solutions using the system shown in FIG. 2.

FIGS. 6 (b), (d), and (f) illustrate a plurality of graphs illustrating scattered light intensity of unit volume as a function of particle diameter for NaCl particles, sucrose particles, and $SiO_2$ particles, respectively.

FIG. 8 illustrates a table including detail properties of generated particles and fitting results for mass concentration and calculated total scattered light intensity against sensor signal output.

FIG. 11 illustrates a table of details of fitting $i_{dp}$ as a function of $d_p$ in Eq. (10) for NaCl, sucrose, $SiO_2$, $Fe_2O_3$, $Al_2O_3$, and elemental carbon particles.

FIG. 12 illustrates a table of the parameters and results of estimating calibration factor from Eq. (12).

DETAILED DESCRIPTION

To overcome the limitations of the low-cost sensors and other PM measurement techniques, this disclosure describes systems and methods for evaluating the relationship between particle composition, size, and signal outputs of a low-cost particle sensor. In the example embodiment, a low-cost particle sensor is selected based on to its high linearity and long-time operational stability in comparison with reference instruments.

In one embodiment, experimental studies for calibration are conducted in a chamber with known aerosols. Mie and Rayleigh scattering expressions are used along with the particle size distributions to predict the measured signals of the low-cost particle sensors. The sensor signal output is then correlated to the integrated information from more sophisticated size distribution measurement instruments to evaluate accuracy. Then, based on the light scattering theory, an expression for a calibration factor (K) dependent on refractive index and size distribution parameters (geometric mean diameter, $d_{pg}$, and geometric standard deviation, $\sigma_g$) was derived to predict the mass concentration and number concentration from the sensor signal output.

Figure 1:
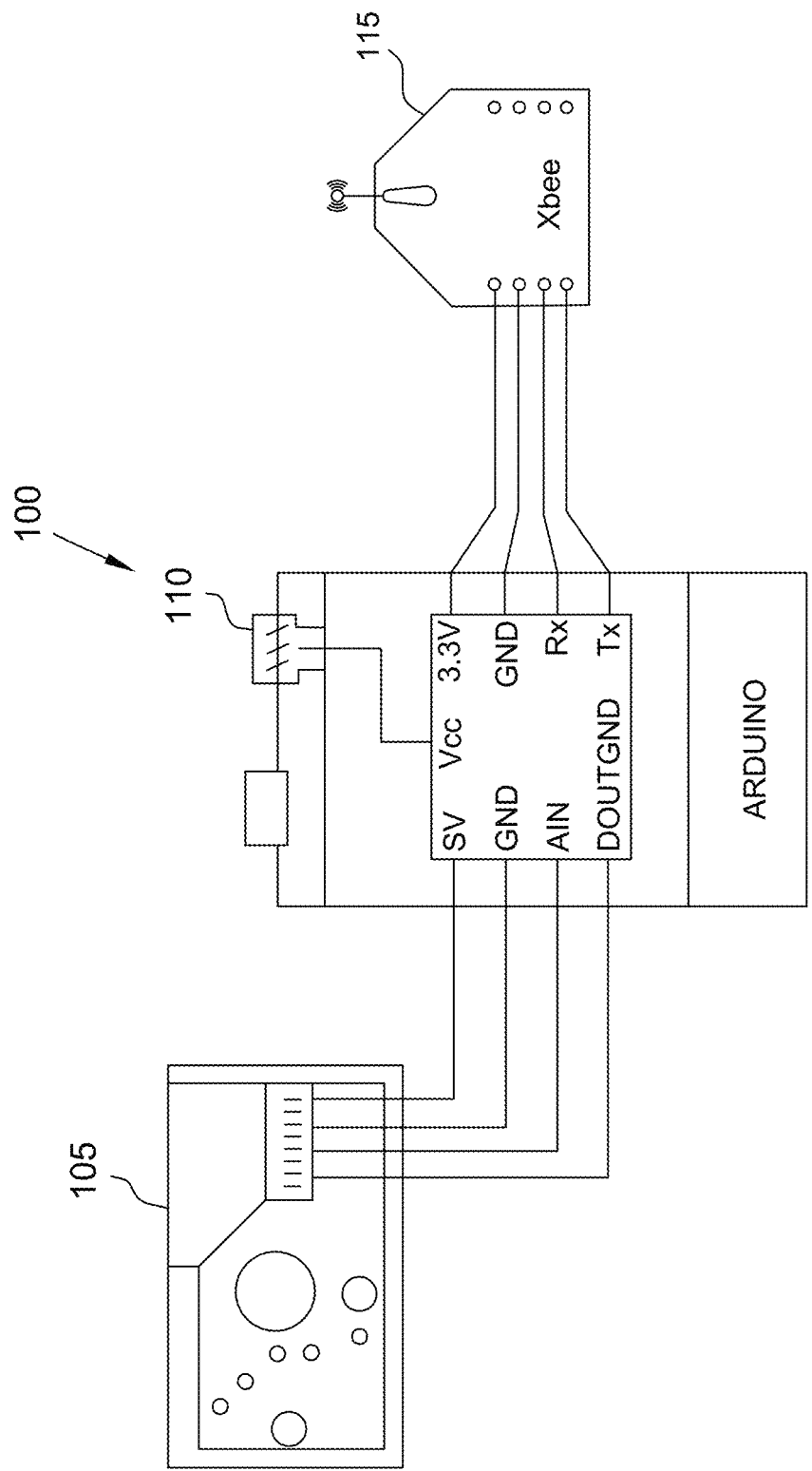
FIG. 1 illustrates a schematic diagram of an exemplary wireless sensor system in accordance with one embodiment of the disclosure.

FIG. 1 illustrates a schematic diagram of an exemplary wireless sensor system 100 in accordance with one embodiment of the disclosure. In the exemplary embodiment, the wireless sensor system 100 comprises a sensor 105 in communication with a controller 110. The controller 100 is also coupled to a wireless module 115. In the exemplary embodiment, wireless module 115 is in communication with at least one remote computer, such as particulate matter analysis (PMA) server 710 (shown in FIG. 13).

In the exemplary embodiment, sensor 105 contains an infrared emitting diode (IRED) and a phototransistor. The IRED illuminates particles in the air flow based on the waveform. For example, the IRED may illuminate particles with a 10 ms pulse-driven waveform whose duty ratio is 0.032. Scattered light intensity is converted to a 0-3.5 V analog signal by the phototransistor. In some embodiments, the analog signal becomes fully developed within 0.28 ms, so the voltage on the phototransistor is recorded at exactly 0.28 ms.

In some embodiments, a 5 V, 2×2 cm2 brushless mini fan is attached to the back of the sensor 105 to allow air flow through the aperture. If the sensor was attached on the wall, the natural air convection of the sensor design is limited. Therefore, the fan may be equipped with the sensor to direct the air flow through the unit that introduces the particles to the sensing region.

The wireless module 115 operates to allow wireless communication. For example, the wireless module 115 is configured with an operating frequency of 2.4 GHz, and a transmission power output of 2 mW. In this example, the range of indoor transmission is 30 meters, and the outdoor free air range is 100 meters. The controller 110 is configured to coordinate timing between the sensor 105 and the wireless module 115. In some embodiments, the controller 110 powers the IRED in the sensor 105 with an accurate 10 ms square waveform. The controller 110 then samples the voltage signal at 0.28 ms after the leading edge of the waveform was detected. Then, the controller 110 converts the analog voltage signal into a digital signal that can be sent by the wireless module 115. In at least one embodiment, the sampling interval of the controller is set to 2.5 seconds, and every four samples were averaged before being transmitted by the wireless module 115. In this embodiment, system 100 transmits a signal every 10 seconds and the remote computer is able to store the signal in a log file.

It is important to ensure that the signal output can be accurately used to determine the mass concentration by a calibration factor. The signal from the sensor 105 is dependent on the particle composition and size distribution. In some embodiments, for the same mass concentration of different particle types (e.g., NaCl, sucrose, and $NH_4NO_3$) and size distributions (e.g., 300 nm, 600 nm, and 900 nm polystyrene latex particles), the sensor signal outputs may be different.

In some embodiments, a systematical calibration of a sensor 105 may be carried out experimentally. Then, with a proposed model, the response of the sensor 105 as a function of particle composition and size distribution parameters would be studied. As described herein, experiments were done with laboratory generated NaCl, sucrose, and $SiO_2$ particles. Different sets of tests with various solution concentrations were done to determine the effect of varying size distributions on the measured signal outputs. The experimental system is shown in FIG. 2.

Figure 2:
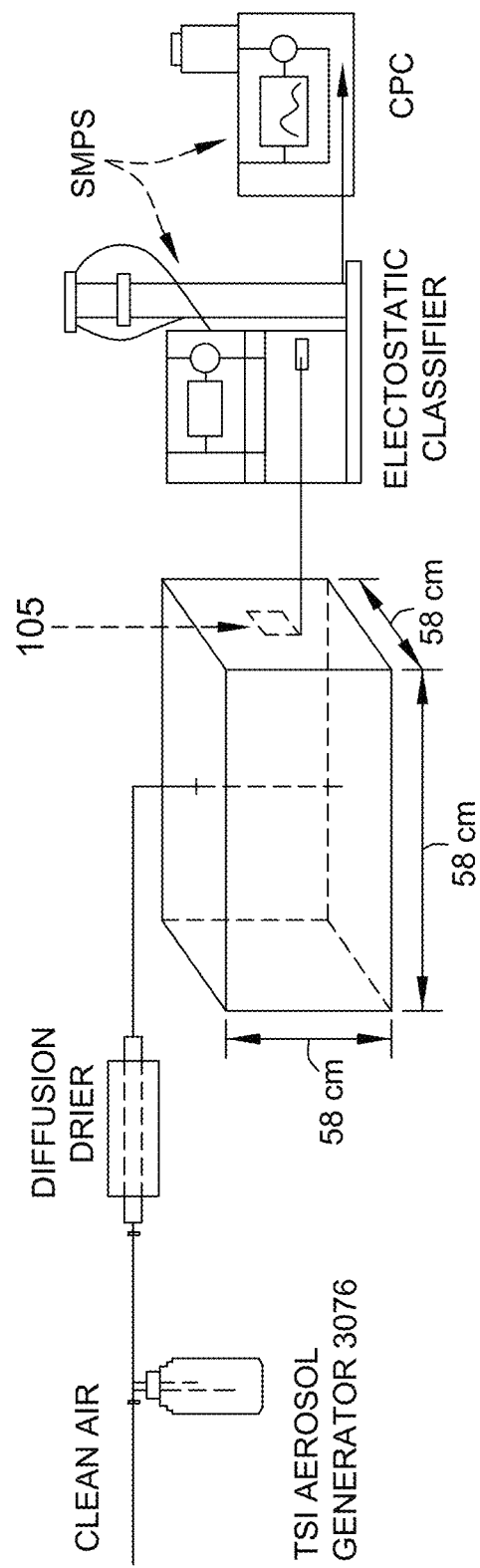
FIG. 2 illustrates a schematic diagram of a system for analyzing the performance of the wireless sensor system shown in FIG. 1.

FIG. 2 illustrates a schematic diagram of a system for comparing the performance of the wireless sensor system 100 (shown in FIG. 1) with that of standard aerosol instruments. A constant output atomizer 3076 produces small particles (dp<600 nm) with an SMPS reference instrument.

Different concentrations of NaCl solutions, sucrose solutions, and $SiO_2$ solutions were added in a constant output atomizer to generate test aerosols with different size distributions. NaCl solutions (0.507 mg mL−1, 1.087 mg mL−1, and 1.892 mg mL−1) and sucrose solutions (1.150 mg mL−1, 3.325 mg mL−1, 4.315 mg mL−1) were prepared by dissolving NaCl (reagent grade≥98%, +80 mesh) and sucrose (>99.5%) in deionized water. $SiO_2$ solutions (1% dispersion and 2% dispersion) were prepared by diluting $SiO_2$ solutions (40 wt. % suspension in H2O, colloidal silica, Sigma-Aldrich) with deionized water. The atomized particles were passing through a diffusion drier to remove the water contents in the particles. Then, the dried particles were sent to a cubic chamber (58 cm×58 cm×58 cm) through the inlet tube at the top of the chamber. On the right side of the chamber, a sensor 105 and a sampling tube that connected the chamber with a scanning mobility particle sizer (SMPS) were placed close to each other at the middle of the right panel. The distance between the sensor 105 center and the sampling tube was around 5 cm, small in comparison to the width of the chamber (58 cm). Thus, the PM sampled by the SMPS was assumed to be the same as that detected by the sensor 105. The SMPS was operated with a three-minute sampling interval to measure the size distributions ($n_d(d_p)$) of the generated particles in the chamber. And as mentioned before, the data log file of the sensor 105 had a 10-second sampling interval. Therefore, every eighteen samples from the sensor 105 were averaged to match the sampling interval of the SMPS.

Figure 3:
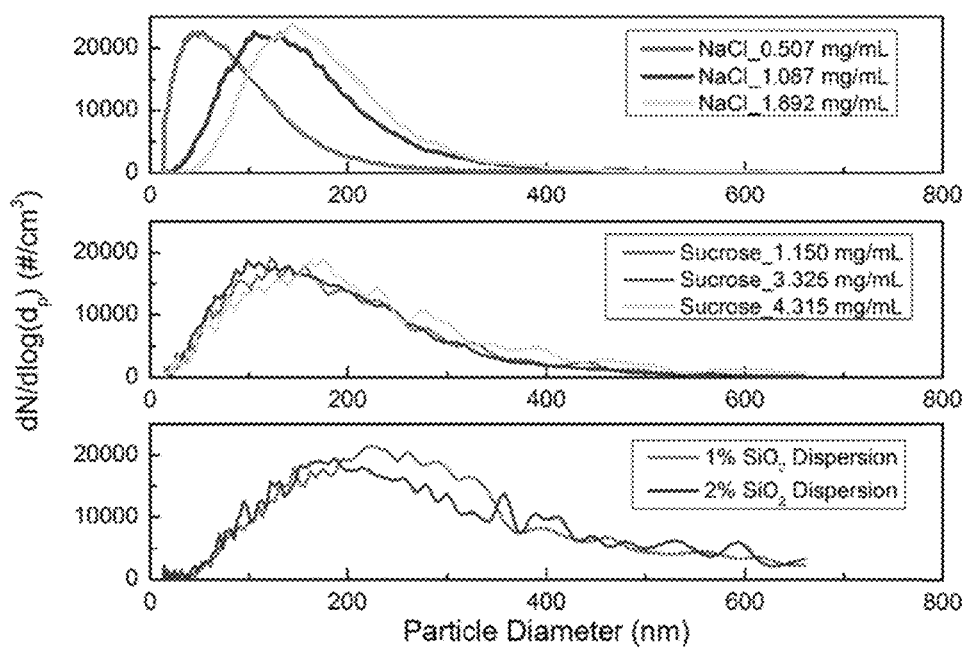
FIG. 3 illustrates a graph of characteristic size distributions of particles generated by the constant output atomizer with different solutions using the system shown in FIG. 2.

FIG. 3 illustrates a graph of characteristic size distributions of particles generated by the constant output atomizer with different solutions using the system shown in FIG. 2. FIG. 4 illustrates a table of densities and size distribution parameters of the particles generated from different solutions using the system shown in FIG. 2. Two critical parameters, the geometric mean diameter ($d_{pg}$) and the geometric standard deviation ($\sigma_g$) of each size distribution are reported in FIG. 4. The difference was not large among the size distributions of particles generated from atomizing sucrose and $SiO_2$ solution. This is mainly caused by the larger standard deviations of the size distributions as shown in FIG. 4, so that the size distributions were broadened, covering each other.

From the experimental setup, the signal output from sensor 105 and the size distribution from SMPS are obtained. These are necessary to calculate the mass concentration and the total scattered light intensity.

The mass concentrations ($m_{total}$) are calculated based on the size distribution function, $n_d(d_p)$, assuming that all particles are spherical:

$$m_{total} = \int \rho_p \frac{\pi d_p^3}{6} n_d(d_p) * d(d_p) \qquad \text{Eq. 1}$$

where $\rho_p$ is the particle density, $d_p$ is the particle diameter. In this embodiment, $n_d(d_p)$ is measured by the SMPS as described in FIG. 2.

Figure 5:
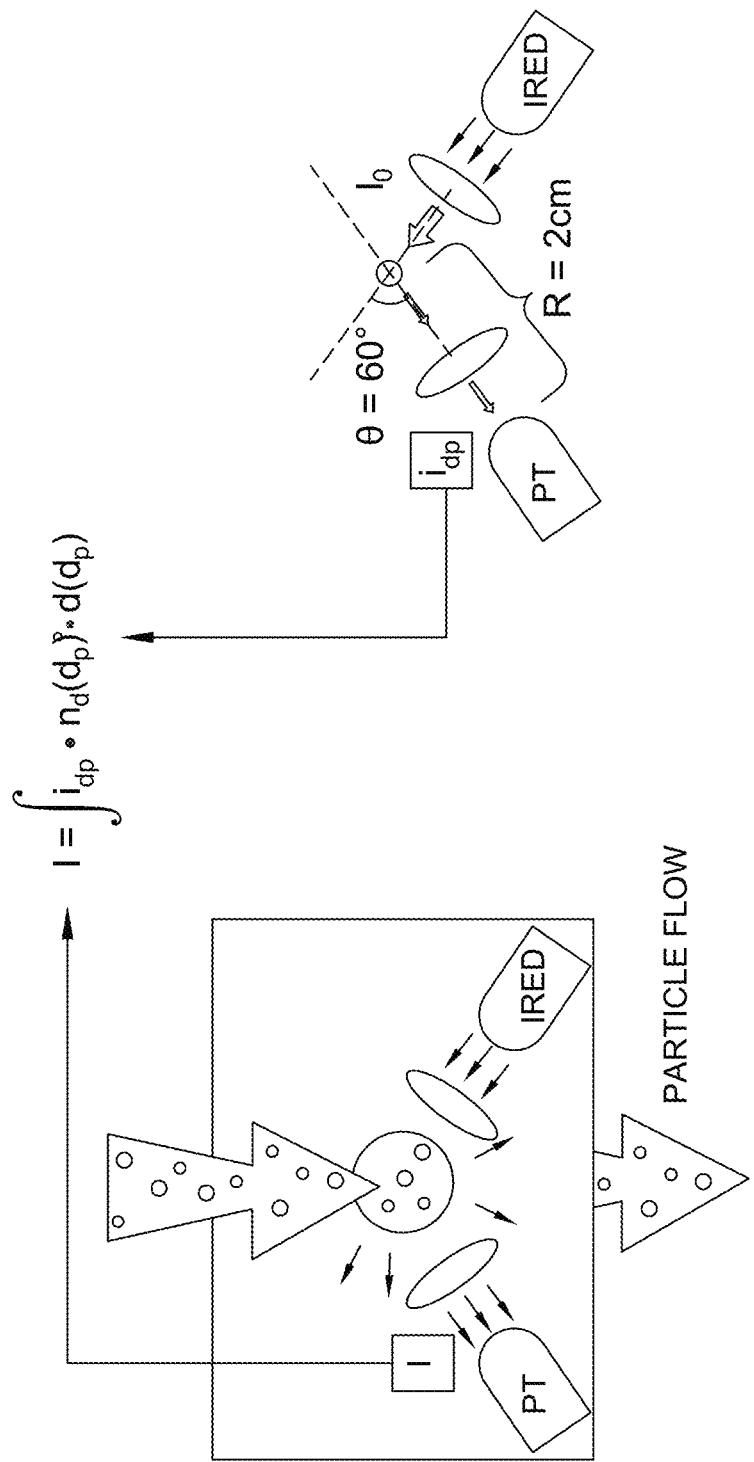
FIG. 5 illustrates a diagram of the working principle and critical parameters of the sensor shown in FIG. 1.

FIG. 5 illustrates a diagram of the working principle and critical parameters of the sensor 105 shown in FIG. 1. "PT" and "IRED" represent the phototransistor and the infrared emitting diode respectively. The total scattered light intensity (I), is calculated based on the working principle of the sensor 105, as shown in FIG. 5. Total scattered light intensity is a summation of the product of the scattered light intensity of a single particle, $i_{dp}$, and the size distribution function, $n_d(d_p)$:

$$I = \int i_{dp} n_d(d_p) * d(d_p) \qquad \text{Eq. 2}$$

As shown in the right side of FIG. 5, $i_{dp}$ is the scattered light intensity detected by the phototransistor when a single particle passing through the measuring point. $i_{dp}$ can be determined by the structure of the sensor 105 and particle properties. Structure parameters include, but are not limited to: the scattering angle ($\theta$), the distance between the illuminated particles and the phototransistor (R), the wavelength of light source ($\lambda$), and the incident light intensity ($I_0$). Particle properties include the particle size ($d_p$) and the refractive index (m). The refractive index can be expressed as a combination of real and imaginary terms ($m = m_{real} - m_{imgi}$). However, particles pass the measuring point as a combination of different particle diameters with different number concentrations, rather than pass through the measuring point one by one. The situation is shown in the left side of FIG. 5. Therefore, $i_{dp}$ is coupled with $n_d(d_p) \cdot d(d_p)$, the number concentration of particles whose size is $d_p$. Then, $i_{dp}$ is integrated from the minimum size to the maximum size.

In one example, the sensor parameters are, $\theta=60°$, R=2 cm, $\lambda=860$ nm, and m=1.536 (NaCl particles), 1.5376 (sucrose particles), and 1.486 ($SiO_2$ particles). The scattered light intensity of a single particle ($i_{dp}$) as a function of particle diameter ($d_p$) is calculated with the mentioned constraints.

A calibration factor (K) linking the mass concentration ($m_{total}$) with the sensor signal output (S) is defined as follows:

$$m_{total} = K(S - S_0) \qquad \text{Eq. 3}$$

$S_0$ is a signal output obtained at a particle concentration of zero due to a certain drift in the electronics of the system. $K_{exp}$, $K_{eq.6}$, and $K_{eq.12}$, represent the calibration factor fitted from the experimental results ($K_{exp}$) or calculated from the proposed model ($K_{eq.6}$ and $K_{eq.12}$), respectively. Mass concentration (m total) is calculated from Eq. (1) with the $n_d(d_p)$ measured by the SMPS and the $\rho_p$ reported in FIG. 4. The sensor signal output (S) is recorded in the log file on the remote computer. So, $K_{exp}$ can be obtained by fitting experimental results into Eq. (3).

To further analyze how other parameters will influence the calibration factor, (S−$S_0$) was expressed as a function of the total scattered light intensity, I $$(S-S_0)=\eta I \quad \text{Eq. 4}$$

where $\eta$ is the response coefficient of the sensor 105, which is determined by the optical characteristics of the phototransistor. In the exemplary embodiment, the value of $\eta$ is determined experimentally by calibration. With Eq. (4), Eq. (3) can be rewritten as:

$$m_{total}=\eta K I \quad \text{Eq. 5}$$

According to Eq. (1) and Eq. (2), $m_{total}$ and $I$ are functions of $n_d(d_p)$ and $i_{dp}$. By substituting Eqs. (1-2) into Eq. (5), the calibration factor ($K_{eq.6}$) can be expressed as Eq. (6), which is dependent on the properties (density, size distribution, and refractive index) of the measured PM.

$$K_{eq.6} = \frac{1}{\eta}\frac{m_{total}}{I} = \frac{1}{\eta}\frac{\int \rho_p \frac{\pi d_p^3}{6} n_d(d_p)*d(d_p)}{\int i_{dp} n_d(d_p)*d(d_p)} \quad \text{Eq. 6}$$

Eq. (6) indicates that the PM size distribution and the PM properties have a complex influence on the calibration factor. To simplify the integration, lognormal size distribution assumption and method of moments are applied in the following derivation. The definition of lognormal size distribution is described below, where $N_\infty$, $\sigma_g$, and $d_{pg}$ represent the total number concentration, the geometric standard deviation, and the geometric mean diameter, respectively.

$$n_d(d_p) = \frac{N_\infty}{(2\pi)^{1/2} d_p \ln\sigma_g} \exp\left[-\frac{(\ln d_p - \ln d_{pg})^2}{2\ln^2 \sigma_g}\right] \quad \text{Eq. 7}$$

A method of moments is defined as:

$$M_r = \int d_p^r n_d(d_p)*d(d_p) \quad \text{Eq. 8}$$

where $M_\gamma$ is the general moment of the particle size distribution, where $\gamma$ represents the order of the moment. The geometric standard deviation ($\sigma_g$) and the geometric mean diameter ($d_{pg}$) can be used to express $M_\gamma$ as shown in Eq. (9). $M_0$ is the zeroth moment, which represents total number concentration and $M_0$ can be cancelled out later.

$$\ln\left(\frac{M_\gamma}{M_0}\right) = \gamma \ln d_{pg} + \frac{\gamma^2}{2}\ln^2 \sigma_g \quad \text{Eq. 9}$$

In order to apply the method of moments to Eq. (6), apart from lognormal size distribution assumption, $i_{dp}$ needs to be expressed as a polynomial function of particle size (dp). Therefore, the relationship between $i_{dp}$ and $d_p$ is fitted for the simplification. Eq. (10) is applied to describe the relationship between $i_{dp}$ and $d_p$. $i_{dp}$ was enlarged with a factor of $10^{15}$ to increase the accuracy of fitting since $i_{dp}$ was too small for calculation. The relationship between $i_{dp}$ and $d_p$ can be divided into two ranges, proportional to $d_p^6$ and $d_p^2$ for small particles in the Rayleigh regime and large particles in the geometric scattering regime, respectively. In some embodiments the transition regime, Mie regime, can quantitatively cover the light scattering properties in the whole size range.

$$\frac{1}{i_{dp}} = \frac{a}{d_p^2} + \frac{b}{d_p^6} \quad \text{Eq. 10}$$

Eq. (10) could be further simplified as Eq. (11) under the following two situations. When most of the measured particles are small, Rayleigh regime will be the dominate regime, and Eq. (10) can be simplified as Eq. (11a). On the contrary, when the measured particles are larger, geometric scattering regime will be the dominant regime. Therefore, Eq. (10) can be simplified as Eq. (11b).

$$i_{dp} \approx \frac{d_p^6}{b} \quad \text{when } d_p \text{ is small and } \sigma_g \text{ is small} \quad \text{Eq. 11a}$$

$$i_{dp} \approx \frac{d_p^2}{b} \quad \text{the rest of the situations} \quad \text{Eq. 11b}$$

The calibration factor ($K_{eq.12}$) can be expressed as Eq. (12) after plugging in Eqs. (6, 8-11).

$$K_{eq.12} = \frac{1}{\eta}*\frac{m_{total}}{I} = \frac{1}{\eta}*\frac{\frac{\rho_p \pi}{6}M_3}{\frac{M_6}{b}} \quad \text{Eq. 12a}$$

$$= \frac{1}{\eta}*\frac{\rho_p b\pi M_3}{6 M_6} = \frac{1}{\eta}*\frac{\rho_p b\pi}{6}*\frac{M_0 * e^{3\ln d_{pg}+\frac{9}{2}\ln^2\sigma_g}}{M_0 * e^{6\ln d_{pg}+18\ln^2\sigma_g}}$$

$$= \frac{1}{\eta}*\frac{\rho_p b\pi}{6}*e^{-3\ln d_{pg}-\frac{27}{2}\ln^2\sigma_g}$$

$$K_{eq.12} = \frac{1}{\eta}*\frac{m_{total}}{I} = \frac{1}{\eta}*\frac{\frac{\rho_p \pi}{6}M_3}{\frac{M_6}{a}} \quad \text{Eq. 12b}$$

$$= \frac{1}{\eta}*\frac{\rho_p a\pi M_3}{6 M_2} = \frac{1}{\eta}*\frac{\rho_p a\pi}{6}*\frac{M_0 * e^{3\ln d_{pg}+\frac{9}{2}\ln^2\sigma_g}}{M_0 * e^{6\ln d_{pg}+18\ln^2\sigma_g}}$$

$$= \frac{1}{\eta}*\frac{\rho_p a\pi}{6}*e^{-3\ln d_{pg}-\frac{27}{2}\ln^2\sigma_g}$$

The errors of the calibration factor predicted by the proposed model ($K_{eq.6}$ and $K_{eq.12}$) can be calculated by Eq. (13), regarding to the experimental results ($K_{exp}$).

$$\text{error} = \frac{K_{exp} - K_{eq.6} \text{ or } K_{eq.12}}{K_{exp}} \quad \text{Eq. 13}$$

A method of estimating number concentration with given parameters is described below. Mass concentration and number concentration are relevant to the third and the zeroth moment of size distributions, respectively. In addition, the mass concentration may be derived from Eq. (3). Therefore, the number concentration ($M_0$) is a function of calibration factor ($K$), sensor signal output ($S$), and size distribution parameters ($\sigma_g$ and $d_{pg}$) as shown in Eqs. (14-15).

$$m_{total} = \frac{\rho_p \pi}{6}M_3 = \frac{\rho_p \pi}{6}*M_0 * e^{3\ln d_{pg}+\frac{9}{2}\ln^2\sigma_g} \quad \text{Eq. 14}$$

$$N = M_0 = \frac{6 m_{total}}{\rho_p \pi * e^{3\ln d_{pg}+\frac{9}{2}\ln^2\sigma_g}} = \frac{K(S-S_0)}{\rho_p \pi * e^{3\ln d_{pg}+\frac{9}{2}\ln^2\sigma_g}} \quad \text{Eq. 15}$$

The number concentration estimated from Eq. (15) is then compared with the number concentration measured by the SMPS. The errors between the two values are calculated with Eq. (16). $N_{SMPS}$ and $N_{eq.15}$ represent the number concentrations measured by the SMPS and evaluated from Eq. (15), respectively.

$$\text{error} = \frac{N_{SMPS} - N_{eq.15}}{N_{SMPSexp}} \quad \text{Eq. 16}$$

Figure 6:
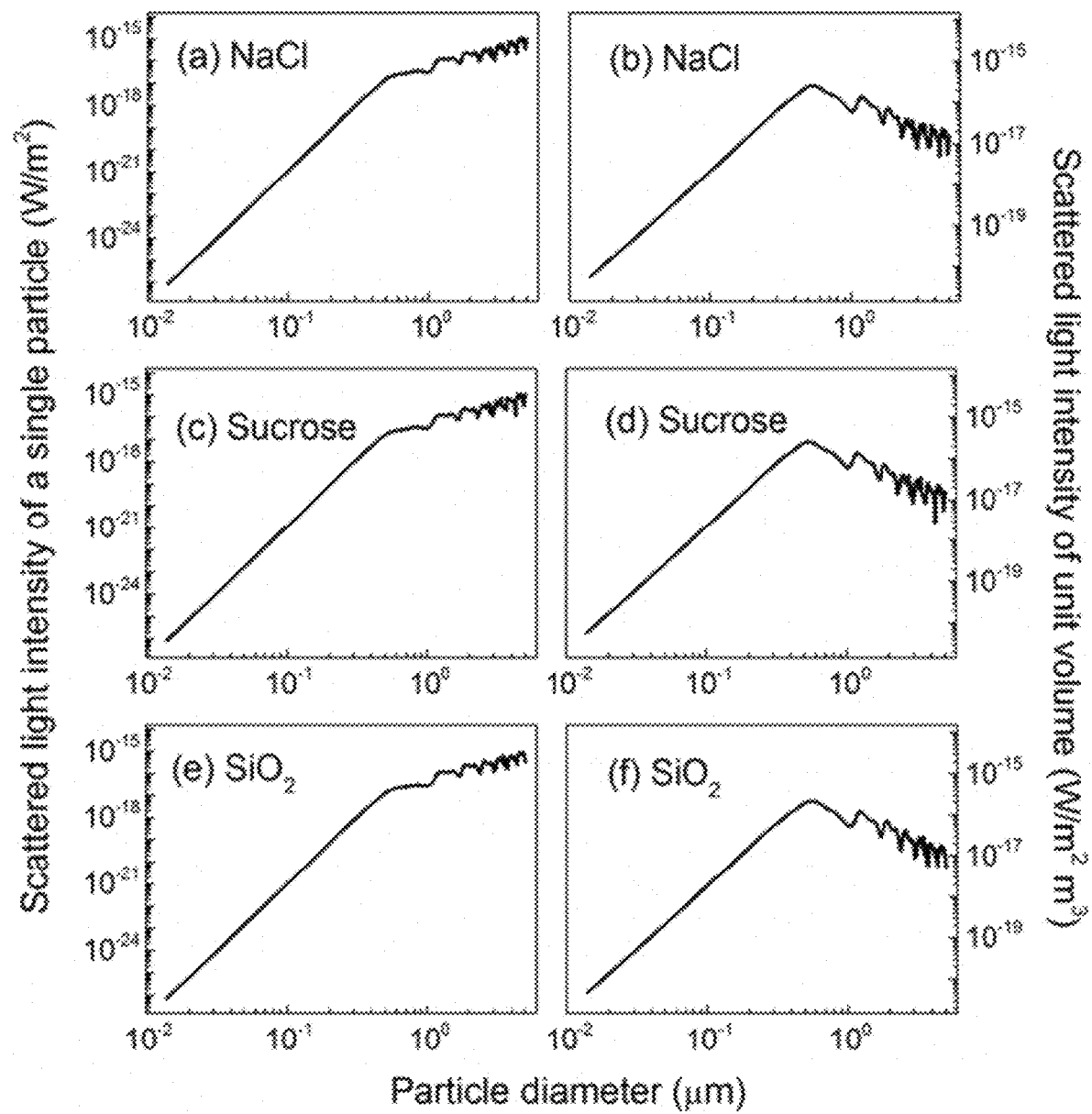
FIGS. 6 (a), (c), and (e) illustrate a plurality of graphs illustrating scattered light intensity of a single particle as a function of particle diameter for NaCl particles, sucrose particles, and $SiO_2$ particles, respectively.

FIGS. 6 (a), (c), and (e) illustrate a plurality of graphs illustrating scattered light intensity of a single particle as a function of particle diameter for NaCl particles, sucrose particles, and $SiO_2$ particles, respectively. FIGS. 6 (b), (d), and (f) illustrate a plurality of graphs illustrating scattered light intensity of unit volume as a function of particle diameter for NaCl particles, sucrose particles, and $SiO_2$ particles, respectively.

As shown in FIG. 6, the scattered light intensity of a single particle ($i_{dp}$) is plotted as a function of particle size ($d_p$). FIG. 6(a, c, and e) show the calculated scattered light intensity of a single particle ($i_{dp}$) as a function of particle diameter ($d_p$). According to the plots, the slopes of the curve change from 6 to 2 with increasing particle diameter on logarithm scale, which demonstrated that $i_{dp}$ is proportional to $d_p^6$ and $d_p^2$ for small and large particles respectively. This linearity is consistent with the different light scattering characteristics in the Rayleigh, Mie, and geometric scattering regimes. In the Rayleigh regime, the scattered light intensity is proportional to $d_p^6$, while in the geometric scattering regime, the scattered light intensity is proportional to $d_p^2$. The transition regime between the above two regimes is the Mie regime.

Since the final aim is to estimate the mass concentration with the sensor signal output, the scattered light intensity of unit volume is plotted against particle diameter in FIG. 6(b, d, and f). The scattered light intensity of unit volume is calculated by dividing the calculated scattered light intensity of a single particle ($i_{dp}$) by the volume of the particle ($\pi d_p^3/6$). After assuming the density of the particle (shown in FIG. 4) is a constant, the curves can be interpreted as the scattered light intensity of unit mass. For NaCl, sucrose, and $SiO_2$ particles, the peaks of responsive curve occur around 600 nm to 1000 nm, which illustrates that the sensor 105 is more sensitive to above range for mass concentration prediction.

With $i_{dp}$ from FIG. 6 and $n_d$ ($d_p$) from the SMPS, calculated total scattered light intensity (I) and total mass concentration ($m_{total}$) is determined by Eqs. (1-2).

Figure 7:
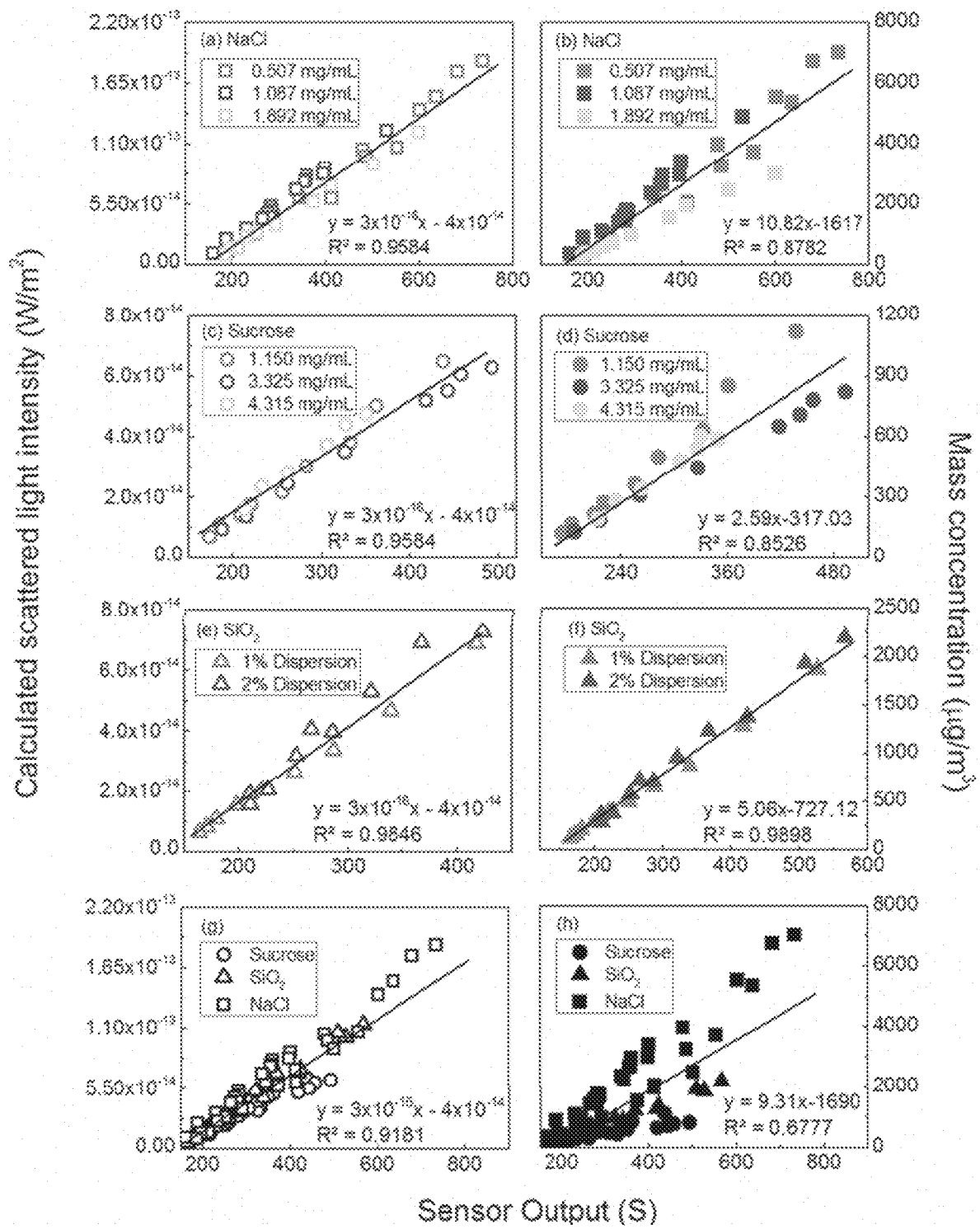
FIG. 7 illustrates a plurality of graphs illustrating example relationships of the calculated total scattered light intensity and the mass concentration as a function of the sensor outputs.

FIG. 7 illustrates a plurality of graphs illustrating the relationship of the calculated total scattered light intensity and the mass concentration as a function of the sensor outputs. Hollow symbols represent calculated scattered light intensity for (a) NaCl particles, (c) sucrose particles, and (e) SiO2 particles. Solid symbols represent mass concentration for (b) NaCl particles, (d) sucrose particles, and (f) SiO2 particles. (g) and (h) are combinations of (a, c, and e) and (b, d, and f) respectively.

FIG. 7 shows the plots of the calculated total scattered light intensity (I) and the total mass concentration ($m_{total}$) versus the signal output (S) over the range of measurements. The parameters: slope, intercept, and $R^2$ for the various cases are shown in columns 3-6 of FIG. 8. Column 3 and column 4 report the fitting equations and the $R^2$ values of the calculated total scattered light intensity (I) versus the sensor signal output (S), while column 5 and column 6 report the fitting equations and the $R^2$ values of the total mass concentration ($m_{total}$) versus the sensor signal output (S). The $R^2$ values are larger than 0.951 in all separate tests, illustrating that the sensor signal outputs are proportional to both the mass concentration and the calculated scattered light intensity.

However, while plotting experiments of a same component with different concentrations on one graph, the calculated total scattered light intensities line up on a single straight line against sensor output, as shown in FIG. 7.

In FIGS. 7(a)-7(f), the fitting equations and the $R^2$ values are obtained by combining all tests of the same composition, while FIG. 7(g, h) illustrate the fitting results of all tests from all compositions. In detail, the $R^2$ values of calculated scattered light intensity (FIG. 7(a, c)) are larger than the $R^2$ values of mass concentration (FIG. 7(b, d)) for NaCl and sucrose tests. The $R^2$ values are comparable for the $SiO_2$ tests (FIGS. 7(e, f)). In FIG. 7(g, h), the $R_2$ value for scattered light intensity (FIG. 7(g)) is significantly larger than the $R^2$ value for mass concentration (FIG. 7(h)) after plotting all measurement data together. This indicates a greater correlation between the signal output and the total calculated scattered light intensity. On the contrary, when estimating the total mass concentration from the signal output, although high linearity was preserved in the separate tests (selected size distributions), the intercept and the calibration factor ($K_{exp}$) changed with the particle size distributions and the particle composition.

Apart from reporting the fitting results, FIG. 8 also includes the estimated calibration factor calculated from Eq. (6) in column 8. Test 2 (NaCl 1.087 g $cc^{-1}$) is chosen as calibration to calculate the response coefficient ($\eta$) due to its highest $R^2$ value for both mass fitting and intensity fitting. After substituting the density ($\rho_p$=2.16 g $cc^{-1}$), the size distribution parameters ($d_{pg}$=119.55 nm, $\sigma_g$=1.69), and the scattered light intensity ($i_{dp}$) into Eq. (6), $\eta$ is equal to $3.85 \times 10^{15}$. By combining the value of $\eta$ and Eq. (6), the calibration factor of each test can be estimated. To evaluate the accuracy of Eq. (6), the errors between the calibration factor from experiments ($K_{exp}$) and the calibration factor from Eq. (6) ($K_{eq.6}$) are calculated with Eq. (13) and reported in column 9 of FIG. 8. The error range of $K_{eq.6}$ can be controlled within ±30% except for Test 5. The calibration factor from the mass fitting result of Test 5 ($K_{exp}$=2.44) was the smallest within seven tests. Based on the error range Eq. (6) can be used to provide moderate accuracy for calibration factor estimation.

As presented in FIGS. 7 and 8, the calibration factor is not universal for all aerosols, but depends on the size distribution parameters and particle composition (refractive index). To further analyze how these parameters would influence the calibration factor, a lognormal distribution is assumed as shown in Eq. (7). The size distribution generated by Eq. (7) is plugged into Eq. (6) to evaluate the influence of each parameter. By assuming lognormal parameters, $\ln\sigma_g$ ranging from 0.1 to 0.7 and $d_{pg}$ ranging from 0.2 to 2 μm respectively, the calibration factor of various size distributions for NaCl particles, sucrose particles, and SiO2 particles is simulated as shown in FIG. 9.

Figure 9:
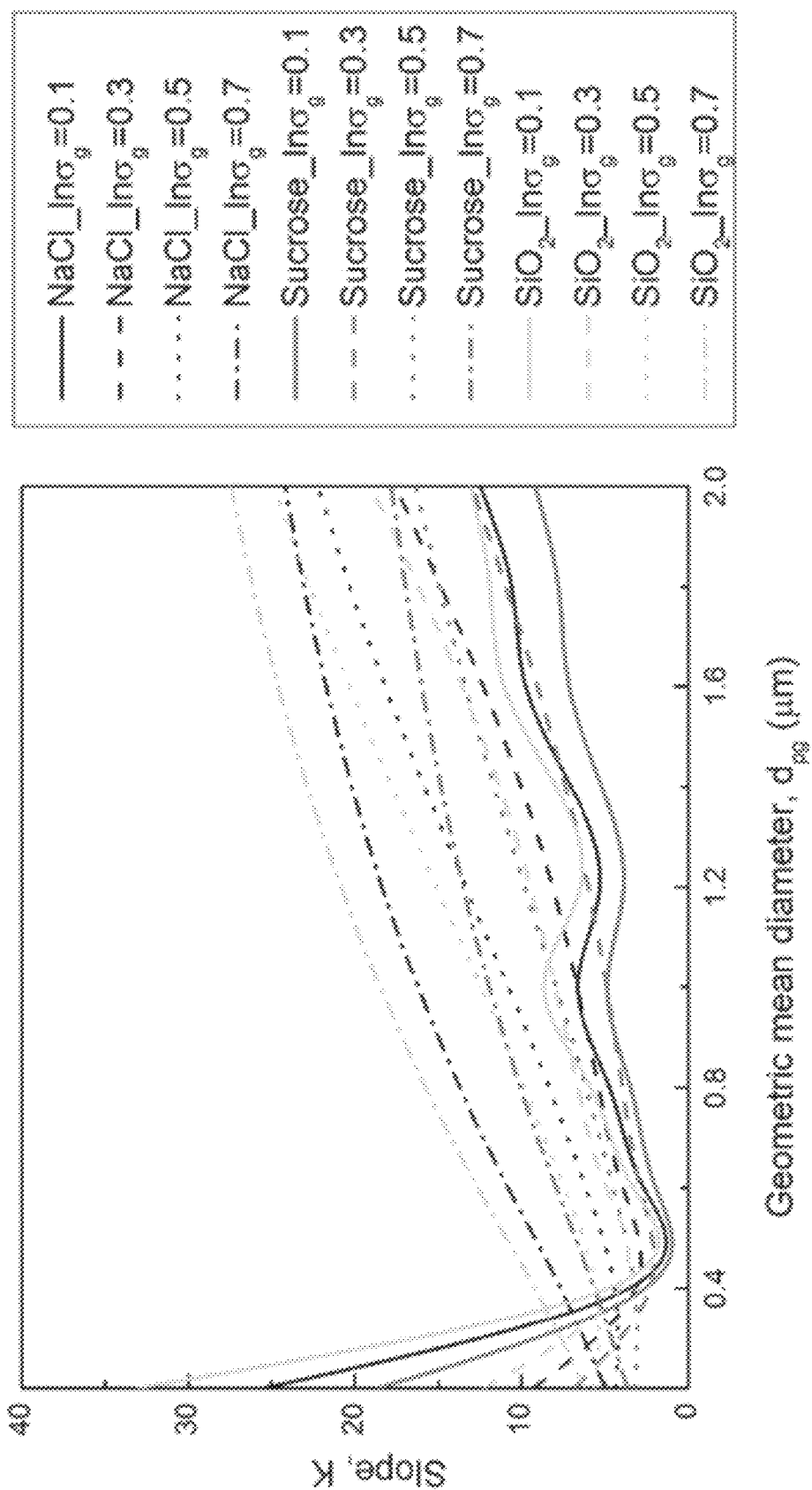
FIG. 9 illustrates a graph of Slope estimated from Eq. (6) for lognormally distributed particles.

FIG. 9 illustrates a graph of Slope estimated from Eq. (6) for lognormally distributed particles. Black, red, and green lines represent NaCl, sucrose, and SiO2 particles respectively. Solid, dash, dot, and dash dot lines represent $\ln\sigma_g$ equal to 0.1, 0.3, 0.5, and 0.7 respectively. The values of calibration factors significantly differ from various combinations of $\ln\sigma_g$ and $d_{pg}$. FIG. 9 could be used for estimating how much error will be created by a one-time calibration. For example, if the sensor 105 is calibrated with $SiO_2$ particles ($\ln\sigma_g$=0.7, $d_p$=1.0 μm), then, the error can be controlled within ±60% while using this calibration factor to measure particles ranges from 0.1-2.0 µm whose $\ln\sigma_g$ is 0.7. However, if the sensor 105 is calibrated with NaCl particles ($\ln\sigma_g$=0.1, dp=0.6 µm), then, the error would be enlarged to ±700% while using this calibration factor to measure particles ranges from 0.1-2.0 µm whose $\ln\sigma_g$ is 0.1.

Furthermore, two rules can be summarized to describe the variation. First, with a small $\ln\sigma_g$ value, the calibration factor is nonmonotonically related to the $d_{pg}$ value. Generally, the calibration factor initially decreases with the increasing $d_{pg}$ value. However, after the turning point, the calibration factor increases with the increasing $d_{pg}$ value in the successive stage. Second, for a larger $\ln\sigma_g$ value, the calibration factor is a monotonic function of $d_{pg}$, and it increases with increasing $d_{pg}$ value. The above two rules are common for NaCl, sucrose, and $SiO_2$ particles.

Figure 10:
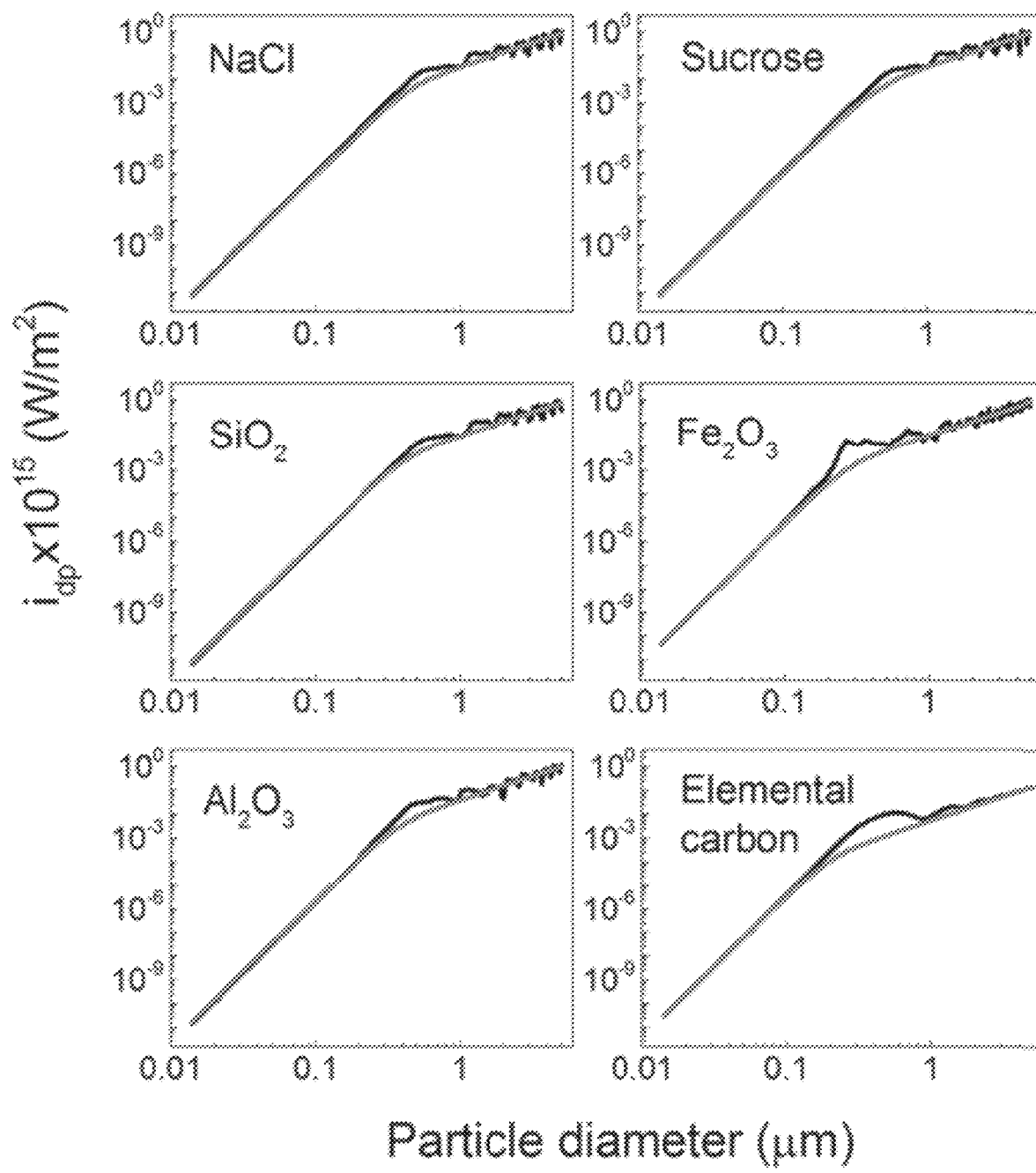
FIG. 10 illustrates a plurality of graphs of the scattered light intensity of a single particle simulated by MiePlot and fitted by Eq. (9) for NaCl, sucrose, $SiO_2$, $Fe_2O_3$, $Al_2O_3$, and elemental carbon particles.

In view of the above rules, $i_{dp}$ is simplified as a function of particle diameter ($d_p$). The details of fitting $i_{dp}$ with $d_p$ for values of a and b with six types of substances—NaCl, sucrose, $SiO_2$, elemental carbon, $Al_2O_3$, and $Fe_2O_3$ are shown in FIG. 10. FIG. 10 illustrates a plurality of graphs of the scattered light intensity of a single particle simulated by MiePlot and fitted by Eq. (9) for NaCl, sucrose, $SiO_2$, $Fe_2O_3$, $Al_2O_3$, and elemental carbon particles. $i_{dp}$ for element carbon whose refractive index has an imaginary part is slightly different from others. The parameters, a, b, and $R^2$ vary with the refractive indices of the different materials for each set are listed in FIG. 11. The $R^2$ values vary from 0.7313 to 0.983. Element carbon demonstrated the highest $R^2$ value, as the imaginary part reduced the wrinkle of the $i_{dp}$ curve, which improved the accuracy of fitting. For other species, lower $R^2$ values result from the fluctuation of the $i_{dp}$ curve.

FIG. 11 illustrates a table of details of fitting $i_{dp}$ as a function of $d_p$ in Eq. (10) for NaCl, sucrose, $SiO_2$, $Fe_2O_3$, $Al_2O_3$, and elemental carbon particles. FIG. 12 illustrates a table of the parameters and results of estimating calibration factor from Eq. (12). Regarding the fitting results as shown in FIGS. 11 and 12, Eq. (10) is capable of depicting the correlation between $i_{dp}$ and $d_p$. $i_{dp}$ is proportional to the $d_p^6$ and $d_p^2$ for small particles and large particles respectively, which leads to the phenomena illustrated in FIG. 9. For small $\ln\sigma_g$, the feature of the aerosol whose geometric mean diameter is $d_{pg}$ is similar to the feature of monodisperse particles with only size $d_{pg}$, so Eq. (6) can be simplified as Eq. (17).

$$K = \frac{1}{\eta} * \frac{\int \rho_p \frac{\pi d_p^3}{6} n_d(d_p) * d(d_p)}{\int i_{dp} n_d(d_p) * d(d_p)} \approx \frac{1}{\eta} * \frac{N\rho_p \frac{\pi d_{pg}^3}{6}}{i_{dp} N}$$
$$= \frac{1}{\eta} * \frac{N\rho_p \frac{\pi d_{pg}^3}{6}}{i_{dp} N}$$

Eq. 17 where $i_{dpg}$ is the scattered light intensity of particles whose size equals to $d_{pg}$. When $d_{pg}$ is small, K is proportional to $d_{pg}^{-3}$, where K decreases with increasing $d_{pg}$. After some turning point, $d_{pg}$ is large enough to fall in the range where $i_{dp}$ is proportional to the $d_p^2$, so K is proportional to $d_{pg}$ and increases with increasing dpg. However, when $\ln\sigma_g$ is larger, the characteristics mentioned above will disappear since the particles tend to be distributed evenly through the size range rather than monodisperse. Under this situation, the larger particles under the size distribution are more influential, so $i_{dp}$ is approximately proportional to the $d_p^2$, so K is proportional to $d_{pg}$ and increases with increasing $d_{pg}$.

Apart from qualitatively explaining the trends in FIG. 9, the method of moments and further simplification of $i_{dp}$ are applied to overcome the disadvantage of repeated calibration.

As shown in Eq. (11), Eq. (10) can be simplified for small and large particles separately. With Eq. (11), Eq. (6) is further simplified as Eq. (12). An expression for K as a function of geometric mean diameter, geometric standard deviation, and refractive index is established by assuming lognormal distribution, as shown in Eq. (12). While some information ($\sigma_g$, $d_{pg}$, and m) will need to be known for determining the value of K. In some embodiments, estimates are inferred for a specific type of aerosol in a region. In other embodiments, Eq. (12a) is applied when most of particles are smaller than 0.5-0.8 µm. Eq. (12b) is applied when most of particles are larger than 0.5-0.8 µm. Generally, using Eq. (12a) or Eq. (12b) is determined based on the particle size distribution parameters.

To validate the equations, Eq. (12) may be applied to the experimental results with the previously calculated parameters. $\eta$ is still equal to $3.85\times10^{15}$. The values of a and b for each composition are from FIG. 11. The density and size distribution parameters for each experiment are from FIG. 4. Since NaCl solutions produced particles with smaller $\sigma_g$ and $d_{pg}$, Eq. (12a) is applied to Tests 1-3. Compared to NaCl particles, sucrose and $SiO_2$ solutions generated particles with larger $\sigma_g$ and $d_{pg}$, so Eq. (12b) is applied to Test 4-8. The calibration factor estimated from Eqs. (12) ($K_{eq.12}$) is listed in FIG. 12. The errors between $K_{exp}$ and $K_{eq.12}$ were calculated with Eq. (13) and listed in the last column of FIG. 12. The errors can be controlled within ±40%, which provides Eq. (12) with reasonable accuracy.

One thing worth noting is that one-time calibration probably would introduce serious errors for mass concentration estimation. For example, if the sensor 105 is just calibrate once and uses the calibration factor of Test 5 ($K_{exp}$=2.44) for other measurements, the errors will be enlarged to −422.13% for the aerosol from Test 3 ($K_{exp}$=12.74). And compared to this, the errors of the proposed model are reasonable and acceptable. In general, the calibration factor can be adjusted according to former calibration results and three parameters (m, $\sigma_g$, and $d_{pg}$) for mass concentration estimation.

As described above, with an estimation of size distribution parameters, the calibration factor can be predicted with moderate accuracy. Furthermore, with known parameters, number concentrations can be derived from Eq. (15). With Eq. (15) and the calibration factor from Eq. (12), the number concentrations for each experiment may be calculated.

The calibration method presented here for estimating mass concentration and number concentration requires particle properties and size distributions. However, the adjusted calibration factor increases the data accuracy for mass concentration. Furthermore, the number concentration is critical for practical use too. Both the improved data quality and additional number concentration will benefit the field measurements.

The calculated total scattered light intensity based on scattering theories is correlated to the experimentally measured signals from the low-cost particle sensor. There is also a dependency on the size distribution and the composition of the particles. The sensor signal outputs were not well correlated to the mass concentration.

The model proposed to determine the calibration factor (K) which would provide a more accurate estimate of the mass concentrations from the signal outputs. Based on the proposed model, an equation for K as a function of the refractive index and the size distribution parameters (geometric standard deviation and geometric mean diameter) is derived. The use of this value of K results in a better accuracy in the estimation of the mass concentration; and additionally, could be used to provide an estimate of the number concentration.

In the exemplary embodiment, a model for determining a calibration factor (the slope, K) to provide an improved accuracy estimate of the mass concentration from the signal output of a sensor. Based on the model, an equation for K as a function of the refractive index and the size distribution parameters (geometric standard deviation and geometric mean diameter) is derived. The value of K improves the accuracy of the estimation of mass concentration, and additionally can be used to provide an estimate of the number concentration.

In the exemplary embodiment, the mass concentration ($m_{total}$) and total scattered light intensity are calculated. The mass concentrations ($m_{total}$) is calculated based on the size distribution function, $n_d(d_p)$, assuming that all particles are spherical using Eq. (1). Where $\rho_p$ is the particle density, $d_p$ is the particle diameter. $n_d(d_p)$ is measured by the SMPS as described above. The total scattered light intensity (I), was calculated based on the size distribution function, $n_d(d_p)$, and the scattered light intensity of a single particle, $i_{dp}$ using Eq. (2).

$i_{dp}$ is obtained by the Rayleigh, Mie, and geometric scattering theory. The following parameters determine the $i_{dp}$: the scattering angle ($\theta$), the distance between the illuminated particles and the phototransistor (R), the wavelength of light source ($\lambda$), the refractive index (m) and the incident light intensity ($I_0$), which are shown in FIG. 5. The refractive index ($m=m_{real}-m_{zing}i$) can be expressed as a combination of real and imaginary terms.

A factor, K, linking the mass concentration (m) with the sensor output (S) is defined in Eq. (3). $S_0$ is a signal output obtained at a particle concentration of zero due to a certain drift in the electronics of the system. The factor K is a function of the refractive index and size distribution of the aerosol. To derive an expression for K, (S-$S_0$) is first expressed as a function of the total scattered light intensity, I, as shown in Eq. (4). In Eq. (4), $\eta$ is the response coefficient of the sensor, which is determined by the optical characteristics of the phototransistor. The value of $\eta$ may vary with each individual sensor but can be determined by calibration. With Eq. (4), Eq. (3) can be written as Eq. (5). According to Eq. (1) and Eq. (2), $m_{total}$ and I are functions of the size distribution and refractive index. By plugging Eqs. (1-2) into Eq. (5), K can be expressed as shown in Eq. (6). The ratio of $m_{total}$ to I is dependent on the properties (density, size distribution, and refractive index) of the measured PM.

In some embodiments, a plurality of low cost sensors, such as sensor 105, are set-up in an array to communicate with the PMA server 710. In these embodiments, the PMA server 710 uses readings from the different sensors 105 in the array to calibrate the sensors. In some further embodiments, the sensors 105 are configured to cross-talk with each other and provide calibration information. The array of sensors is used to generate a spatial temporal map of particulate matter and air quality.

In other embodiments, a high quality sensor is used to provide compensation data to a low cost sensor array. In some embodiments, the high quality sensor may be mobile.

In a further embodiment, one or more sensors are calibrated based on multiple wavelengths.

In still a further embodiment, one or more low cost sensors are added to one or more mobile devices, such as drones. The mobile device travel around an area (indoor and outdoor) to map air quality. In some embodiments, the mobile device may map out the different concentrations of particulate matter in the area of a fire to generate a path of least PM for a firefighter to travel along.

In even further embodiments, the low-cost sensor is pre-calibrated in the lab prior to installation. This precalibration is done based on laboratory measurements of particles and the individual sensor.

Figure 13:
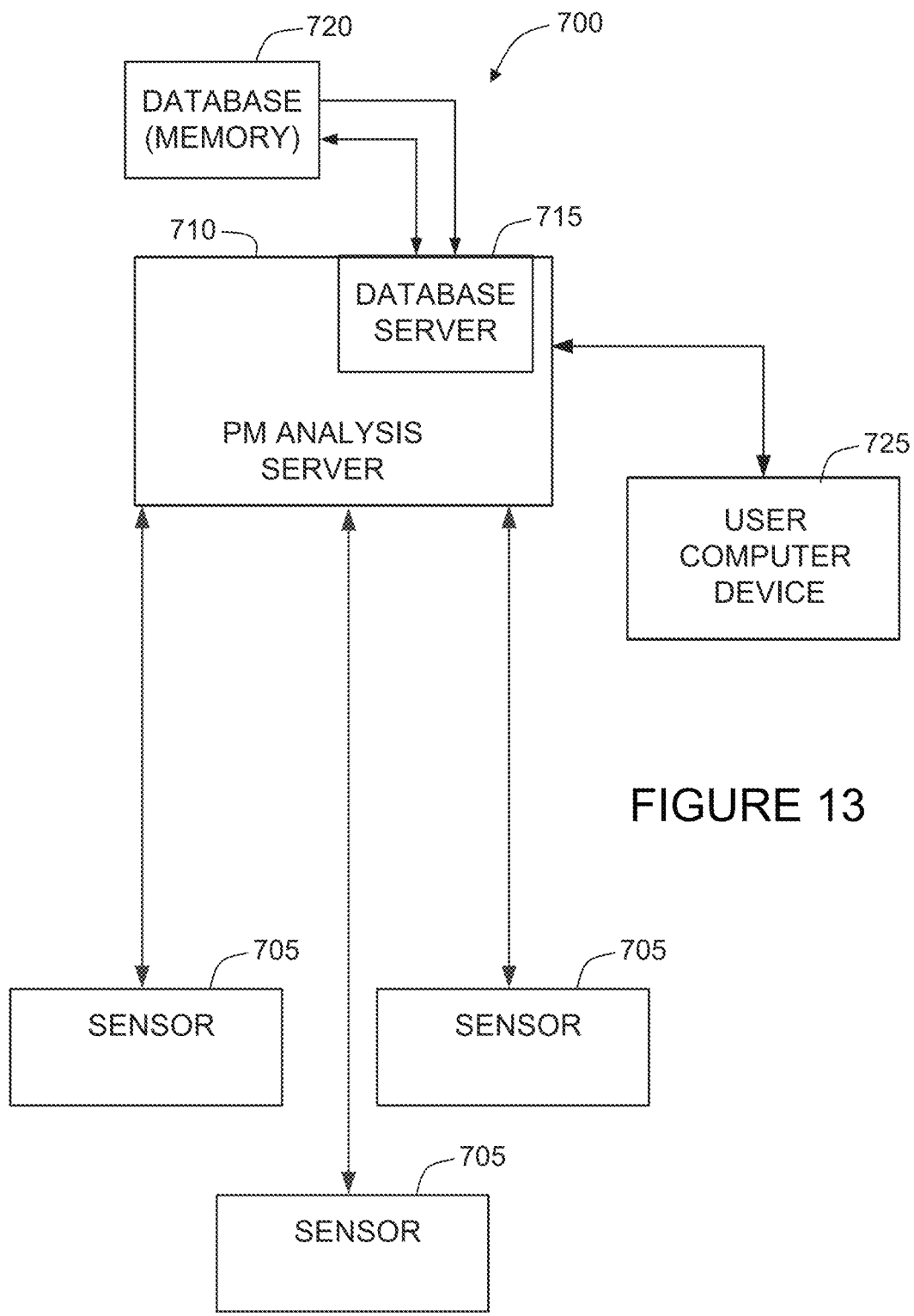
FIG. 13 illustrates a simplified block diagram of an exemplary particulate matter analysis system.

FIG. 13 depicts a simplified block diagram of an exemplary particulate matter analysis (PMA) computer system 700 for performing analysis of PM sensor output. In the exemplary embodiment, system 700 may be used for analyzing sensor data from multiple PM sensors. As described herein in more detail, a particulate matter analysis ("PMA") server 710 (also known as a PMA computer device 710), may be configured to (i) receive a plurality of sensor data from a plurality of sensors; (ii) determine a plurality of correlations between the plurality of sensors based on the plurality of sensor data; (iii) generate a calibration factor for each of the plurality of sensors based on the plurality of correlations; and (iv) transmit the calibration factor to the corresponding sensors.

In the exemplary embodiment, sensors 705 are devices that measure parameters or characteristics. In some embodiments, sensors 705 are similar to sensors 105, shown in FIG. 1. In the exemplary embodiment, sensors 705 include particulate matter sensors and include an infrared emitting diode (IRED) and a phototransistor. The IRED illuminates particles in the air flow based on the waveform. For example, the IRED may illuminate particles with a 10 ms pulse-driven waveform whose duty ratio is 0.032. Scattered light intensity is converted to a 0-3.5 V analog signal by the phototransistor. Sensors 705 measure attributes, parameters, and/or characteristics and transmit that data to a remote computer device, such as PMA server 710. In some embodiments, sensors 705 monitor PM in either indoors or outdoors environments.

In the exemplary embodiment, sensors 705 include code or a software application, which enables sensors 705 to transmit data to remote computer devices, such as PMA server 710, using the Internet or other network. More specifically, sensors 705 are communicatively coupled to PMA server 710 through many interfaces including, but not limited to, at least one of hard wired connections, the Internet, a network, such as the Internet, a local area network (LAN), a wide area network (WAN), or an integrated services digital network (ISDN), a dial-up-connection, a digital subscriber line (DSL), a cellular phone connection, and a cable modem. Sensors 705 may capture numerical data, categorical data, image data, and sound data. Sensors 705 may capture data continuously over time. Sensors 705 may also capture data at one or more discrete intervals of time. Sensors 705 capture data directly, through wires, and/or through wireless connections, such as those described above.

In the exemplary embodiment, user computer devices 725 are computers that include a web browser or a software application, which enables user computer devices 725 to access remote computer devices, such as PMA server 710, using the Internet or other network. More specifically, user computer devices 725 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 725 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 715 is communicatively coupled to a database 720 that stores data. In one embodiment, database 720 may include sensor data, non-sensor data, calibration parameters, and weights. In the exemplary embodiment, database 720 is stored remotely from PMA server 710. In some embodiments, database 720 is decentralized. In the exemplary embodiment, a user, may access database 720 via user computer device 725 by logging onto PMA server 710, as described herein. In some embodiments, database 720 includes any computer server, cloud or other digital data storage device.

PMA server 710 may be in communication with a plurality of sensors 705 and a plurality of user computer devices 725 to analyze the output of multiple sensors 705.

Figure 14:
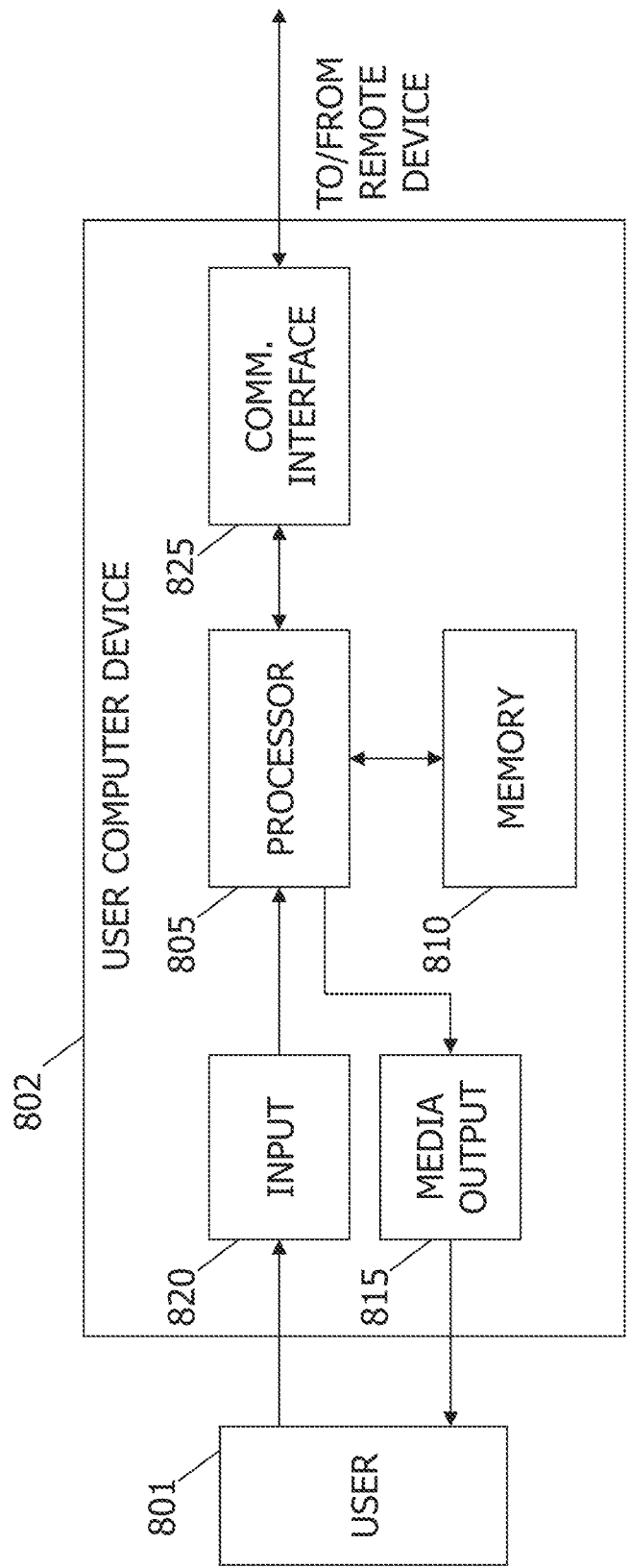
FIG. 14 illustrates an exemplary configuration of a client computer device as shown in FIG. 13, in accordance with one embodiment of the present disclosure.

FIG. 14 depicts an exemplary configuration of client computer device, in accordance with one embodiment of the present disclosure. User computer device 802 may be operated by a user 801. User computer device 802 may include, but is not limited to, system 100, (shown in FIG. 1) sensor 705 and user computer devices 725 (both shown in FIG. 13). User computer device 802 may include a processor 805 for executing instructions. In some embodiments, executable instructions may be stored in a memory area 810. Processor 805 may include one or more processing units (e.g., in a multi-core configuration). Memory area 810 may be any device allowing information such as executable instructions and/or transaction data to be stored and retrieved. Memory area 810 may include one or more computer readable media.

User computer device 802 may also include at least one media output component 815 for presenting information to user 801. Media output component 815 may be any component capable of conveying information to user 801. In some embodiments, media output component 815 may include an output adapter (not shown) such as a video adapter and/or an audio adapter. An output adapter may be operatively coupled to processor 805 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 815 may be configured to present a graphical user interface (e.g., a web browser and/or a client application) to user 801. A graphical user interface may include, for example, an interface for viewing sensor data. In some embodiments, user computer device 802 may include an input device 820 for receiving input from user 801. User 801 may use input device 820 to, without limitation, select a sensor to review.

Input device 820 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 815 and input device 820.

User computer device 802 may also include a communication interface 825, communicatively coupled to a remote device such as PMA server 710 (shown in FIG. 13). Communication interface 825 may include, for example, a wired or wireless network adapter and/or a wireless data transceiver for use with a mobile telecommunications network.

Stored in memory area 810 are, for example, computer readable instructions for providing a user interface to user 801 via media output component 815 and, optionally, receiving and processing input from input device 820. A user interface may include, among other possibilities, a web browser and/or a client application. Web browsers enable users, such as user 801, to display and interact with media and other information typically embedded on a web page or a website from PMA server 710. A client application may allow user 801 to interact with, for example, PMA server 710. For example, instructions may be stored by a cloud service, and the output of the execution of the instructions sent to the media output component 715.

Figure 15:
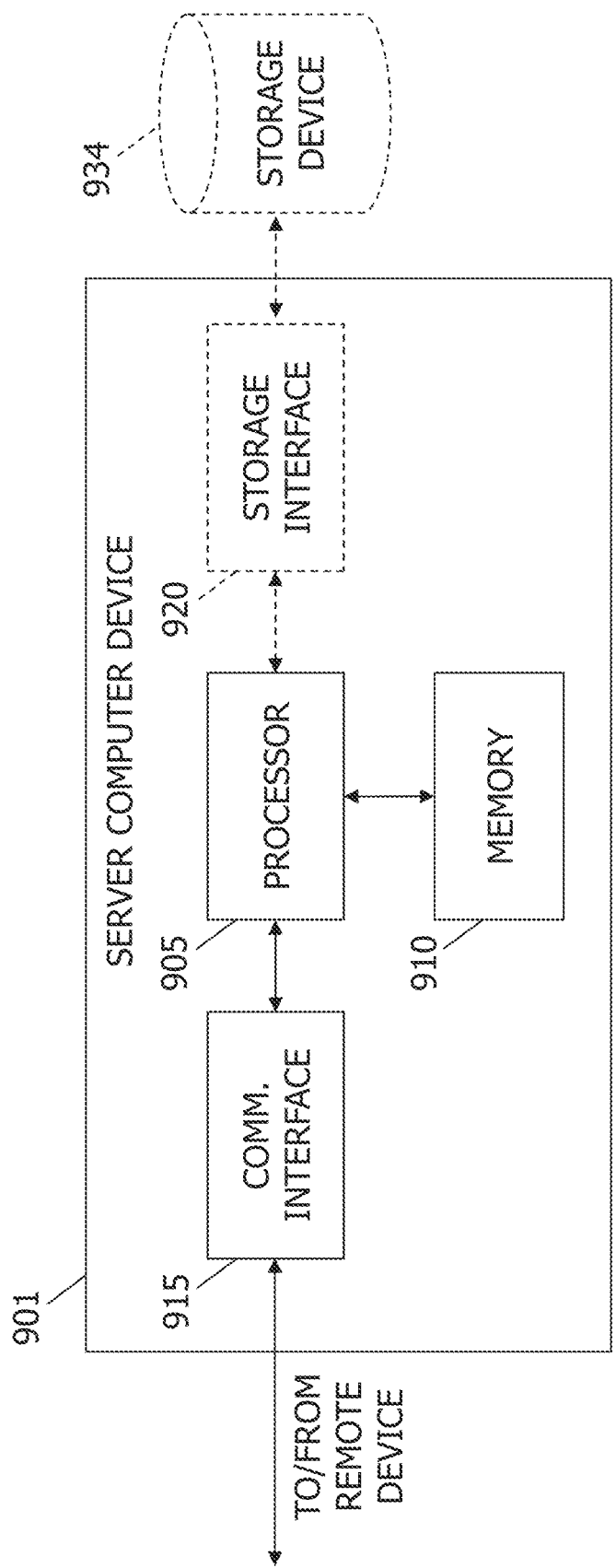
FIG. 15 illustrates an exemplary configuration of a server system as shown in FIG. 13, in accordance with one embodiment of the present disclosure.

FIG. 15 depicts an exemplary configuration of server system, in accordance with one embodiment of the present disclosure. Server computer device 901 may include, but is not limited to, PMA server 710 and database server 715 (both shown in FIG. 13). Server computer device 901 may also include a processor 905 for executing instructions. Instructions may be stored in a memory area 910. Processor 905 may include one or more processing units (e.g., in a multi-core configuration).

Processor 905 may be operatively coupled to a communication interface 915 such that server computer device 901 is capable of communicating with a remote device such as another server computer device 901, PMA server 710, sensor 705, and user computer device 725 (both shown in FIG. 13) (for example, using wireless communication or data transmission over one or more radio links or digital communication channels). For example, communication interface 915 may receive requests from user computer devices 725 via the Internet, as illustrated in FIG. 13.

Processor 905 may also be operatively coupled to a storage device 934. Storage device 934 may be any computer-operated hardware suitable for storing and/or retrieving data, such as, but not limited to, data associated with database 720 (shown in FIG. 13). In some embodiments, storage device 934 may be integrated in server computer device 901. For example, server computer device 901 may include one or more hard disk drives as storage device 934.

In other embodiments, storage device 934 may be external to server computer device 901 and may be accessed by a plurality of server computer devices 901. For example, storage device 934 may include a storage area network (SAN), a network attached storage (NAS) system, and/or multiple storage units such as hard disks and/or solid state disks in a redundant array of inexpensive disks (RAID) configuration.

In some embodiments, processor 905 may be operatively coupled to storage device 934 via a storage interface 920. Storage interface 920 may be any component capable of providing processor 905 with access to storage device 934. Storage interface 920 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 905 with access to storage device 934.

Processor 905 may execute computer-executable instructions for implementing aspects of the disclosure. In some embodiments, the processor 905 may be transformed into a special purpose microprocessor by executing computer-executable instructions or by otherwise being programmed. For example, the processor 905 may be programmed with the instructions.

Figure 16:
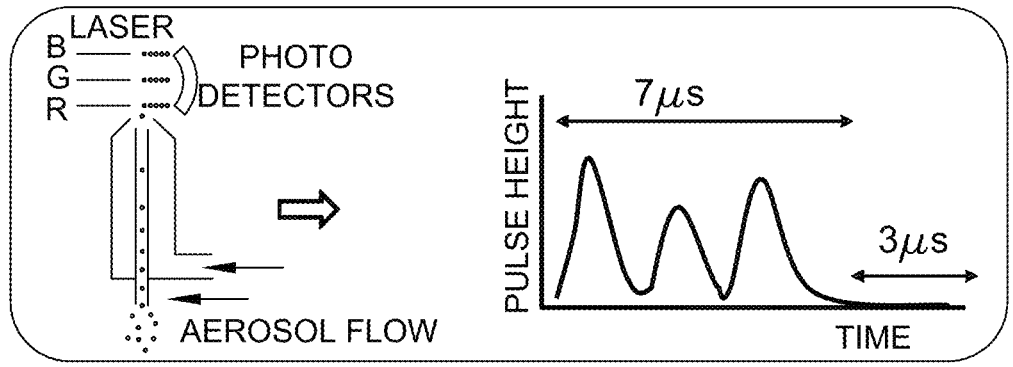
FIG. 16 illustrates a schematic of a system for detecting particulate matter using a plurality of lasers.

FIG. 16 illustrates a schematic of a system for detecting particulate matter using a plurality of lasers.

Figure 17:
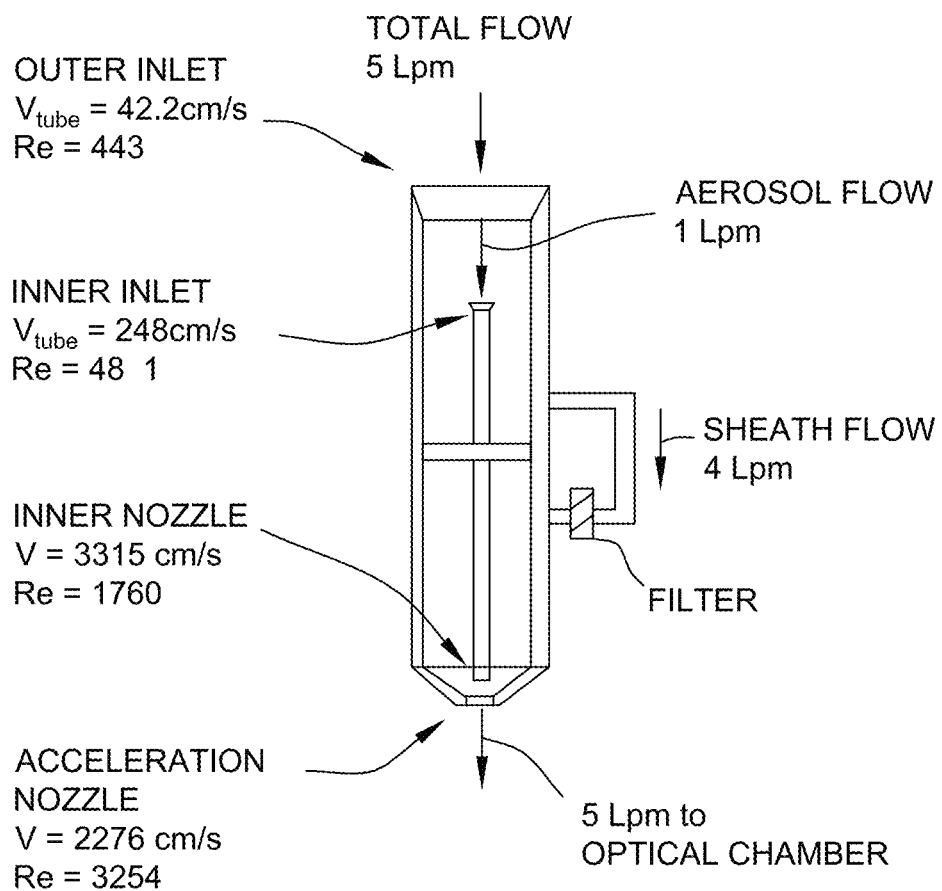
FIG. 17 illustrates a detailed schematic diagram of the system for detecting particulate matter as shown in FIG. 16.

FIG. 17 illustrates a detailed schematic diagram of the system for detecting particulate matter as shown in FIG. 16.

Figure 18:
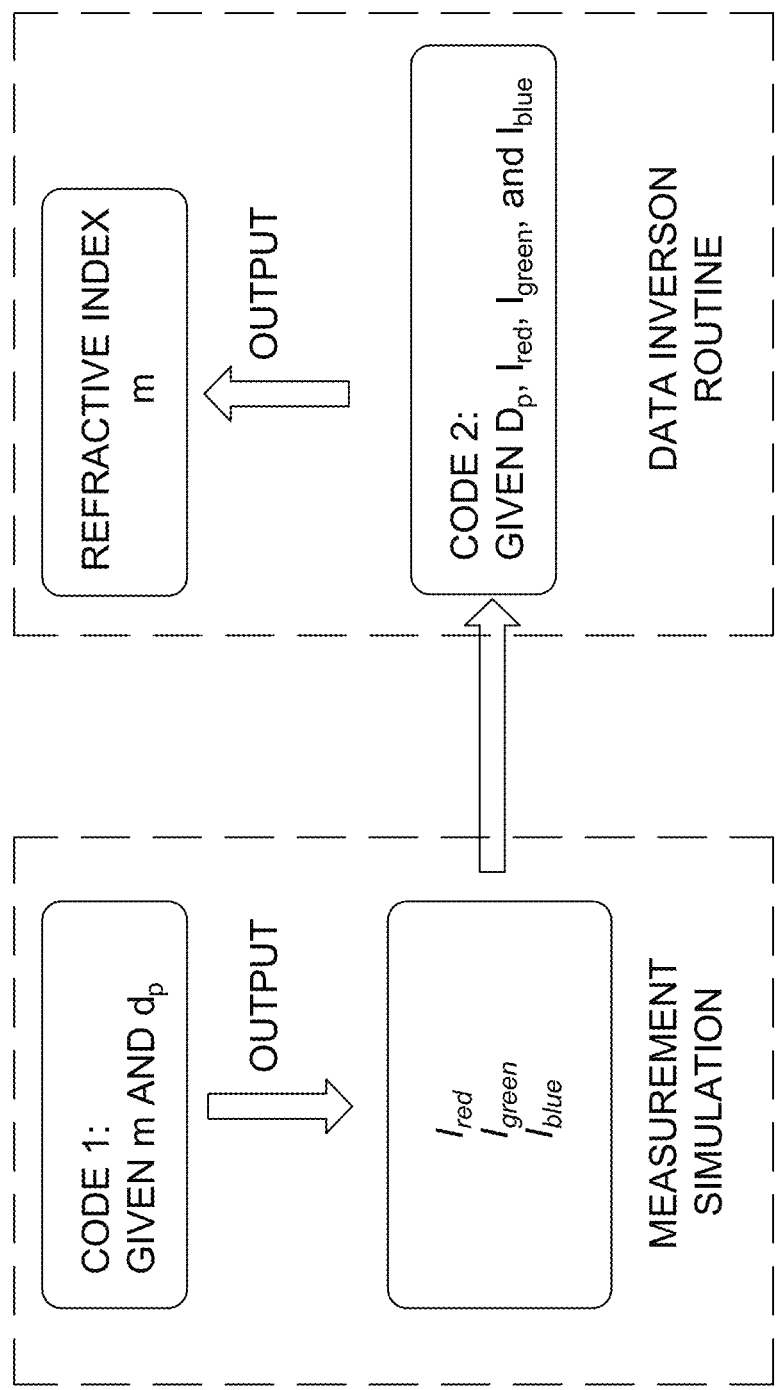
FIG. 18 illustrates a data flow diagram of the algorithm for detecting particulate matter using the system shown in FIGS. 16 and 17.

FIG. 18 illustrates a data flow diagram of the algorithm for detecting particulate matter using the system shown in FIGS. 16 and 17. In this algorithm, $d_p$ is known from the time-of-flight measurement. Simultaneously, pulse height is determinable that denotes $I_{red}$, $I_{green}$, and $I_{blue}$. Then the refractive index (m) is determined based on $I_{red}$, $I_{green}$, and $I_{blue}$.

Figure 19:
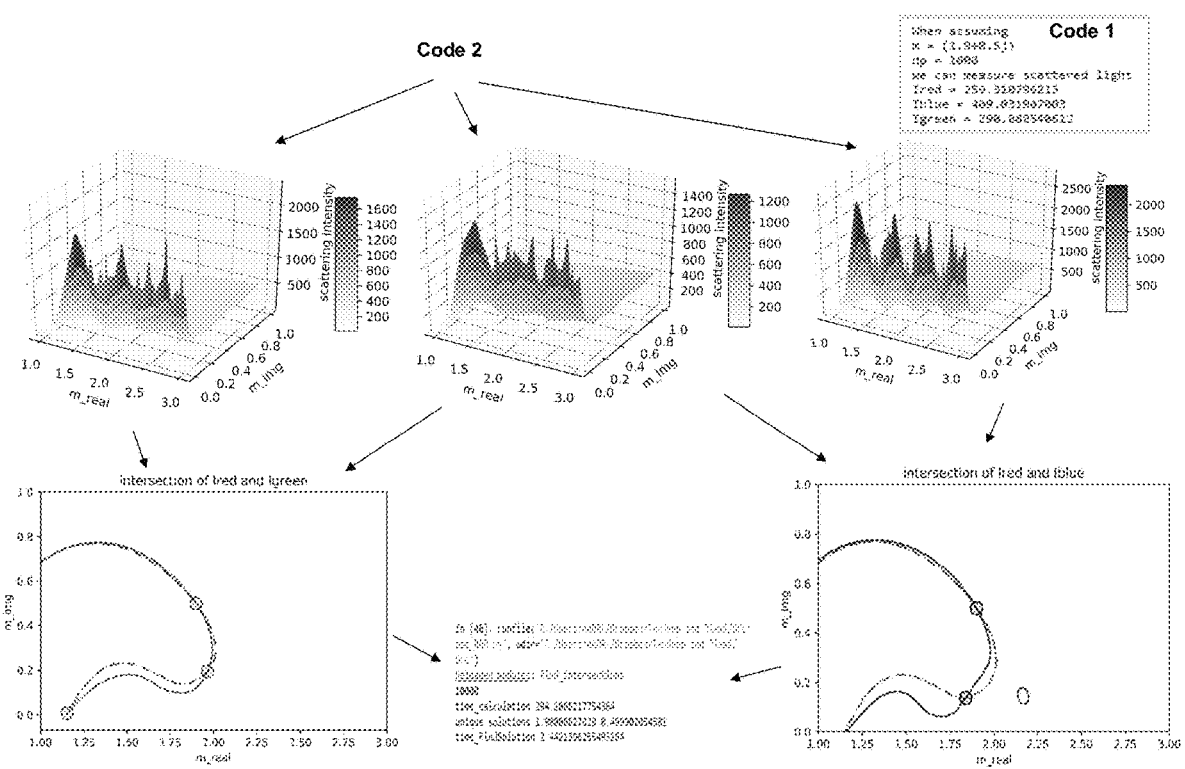
FIG. 19 illustrates a plurality of graphs of results of using the system shown in FIGS. 16 and 17.

FIG. 19 illustrates a plurality of graphs of results of using the system shown in FIGS. 16 and 17.

As shown in FIGS. 16 through 19, in another embodiment of the PM sensor, a multiwavelength system is developed. This includes 3 lasers providing 3 different scattering signals off the same particle. An innovative flow system based on the inertial behavior of particles is used to ensure that particles enter the optical view volume, one at a time, resulting in a signal as shown in the inset figure. Based on the time measurement of the peaks, an equation is developed to obtain the size independently. The three scattering intensity signals are then inverted by a unique algorithm. The use of three wavelengths thus enhances the accuracy of the signal. Then, using the algorithms and Mieplot, one can establish the refractive index of the particle. Using a database of refractive indices, the type of particle can be established—e.g. silica, carbonaceous, or heavy metals, etc. by use of a machine learning algorithm. Thus, this embodiment not only enhances the accuracy, but provides the size distribution and chemical composition.

At least one of the technical solutions to the technical problems provided by this system may include: (i) improved accuracy of PM sensors, (ii) low-cost solutions for PM sensors, and (iii) providing arrays of lower cost sensors instead of expensive high resolution sensors.

The methods and systems described herein may be implemented using computer programming or engineering techniques including computer software, firmware, hardware, or any combination or subset thereof, wherein the technical effects may be achieved by performing at least one of the following steps: (a) receive a plurality of sensor data from a plurality of sensors; (b) determine a plurality of correlations between the plurality of sensors based on the plurality of sensor data; (c) generate a calibration factor for each of the plurality of sensors based on the plurality of correlations; and (d) transmit the calibration factor to the corresponding sensors.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor analysis computer device for analyzing particulate matter comprising:
   at least one memory; and
   at least one processor in communication with the at least one memory, and further in communication with a plurality of sensors configured to measure particulate matter, the at least one processor programmed to:
   store a plurality of parameter data for the plurality of sensors including a calibration factor for each sensor of the plurality of sensors;
   receive a plurality of sensor data from the plurality of sensors;
   determine a plurality of correlations between the plurality of sensors based on the plurality of sensor data;
   update at least one of the plurality of calibration factors based on the plurality of correlations;
   receive a sensor signal from each sensor of the plurality of sensors; and
   apply the corresponding calibration factor to the received sensor signal to determine an adjusted sensor signal for each of the plurality of sensor signals from the plurality of sensors.

2. The computer device of claim 1, wherein the at least one processor is further programmed to determine the calibration factor based, at least in part, on experimental testing of the corresponding sensor.

3. The computer device of claim 1, wherein the at least one processor is further programmed to generate the calibration factor based, at least in part, on signal output of the corresponding sensor detecting zero particles.

4. The computer device of claim 1, wherein the plurality of parameter data includes structural data associated with the corresponding sensor.

5. The computer device of claim 1, wherein at least one sensor of the plurality of sensors includes a photo resistor and an infrared emitting diode.

6. The computer device of claim 1, wherein at least one sensor of the plurality of sensors includes a plurality of lasers, wherein the lasers are configured to each provide different scattering signals of a detected particle.

7. The computer device of claim 1, wherein the at least one processor is further programmed to receive sensor data from at least one high-resolution sensor and use the sensor data from the at least one high-resolution sensor to calculate the calibration factor.

8. The computer device of claim 1, wherein the at least one processor is further programmed to periodically determine an updated calibration factor based on subsequent sensor data from the corresponding sensor.

9. The computer device of claim 1, wherein the at least one processor is further programmed to:
  receive a sensor signal from at least one sensor of the plurality of sensors; and
  apply the corresponding correlation factor to the received sensor signal to determine an adjusted sensor signal.

10. A system for analyzing particulate matter comprising:
  a plurality of sensors configured to measure particulate matter; and
  a sensor analysis computer device in communication with the plurality of sensors comprising at least one memory and at least one processor in communication with the at least one memory, the at least one processor programmed to:
    store a plurality of parameter data for the plurality of sensors including a calibration factor for each sensor of the plurality of sensor;
    receive a plurality of sensor data from the plurality of sensors;
    determine a plurality of correlations between the plurality of sensors based on the plurality of sensor data;
    update at least one of the plurality of calibration factors based on the plurality of correlations;
    receive a sensor signal from each sensor of the plurality of sensors; and
    apply the corresponding calibration factor to the received sensor signal to determine an adjusted sensor signal for each of the plurality of sensor signals from the plurality of sensors.

11. The system of claim 10, wherein the sensor analysis computer device is further programmed to transmit the at least one updated calibration factor to the corresponding sensor, wherein the corresponding sensor is configured to adjust subsequent sensor output based on the updated calibration factor.

12. The system of claim 10, wherein the plurality of sensors are each the same type of sensor.

13. The system of claim 10, wherein the sensor analysis computer device is further programmed to receive the sensor data wirelessly from each of the plurality of sensors.

14. The system of claim 10, wherein the plurality of sensors are low-cost sensors.

15. The system of claim 10, wherein the sensor analysis computer device is further programmed to receive sensor data from a high-resolution sensor and use the sensor data from the high-resolution sensor to calculate the calibration factor.

16. The system of claim 10, wherein the sensor analysis computer device is further programmed to generate a spatial temporal map of the particulate matter in an area define by the plurality of sensors.

17. The system of claim 10, wherein the sensor analysis computer device is further programmed to periodically determine updated calibration factors for the plurality of sensors based on subsequent sensor data from the corresponding sensors.

18. The system of claim 10, wherein at least one sensor of the plurality of sensors includes a photo resistor and an infrared emitting diode.

19. The system of claim 10, wherein at least one sensor of the plurality of sensors includes a plurality of lasers, wherein the lasers are configured to each provide different scattering signals of a detected particle.

20. The computer device of claim 1, wherein the at least one processor is further programmed to transmit the at least one updated calibration factor to the corresponding sensor, wherein the corresponding sensor is configured to adjust subsequent sensor output based on the updated calibration factor.

* * * * *

UNITED STATES PATENT AND TRADEMARK OFFICE
CERTIFICATE OF CORRECTION

PATENT NO. : 11,385,177 B2
APPLICATION NO. : 16/383385
DATED : July 12, 2022
INVENTOR(S) : Pratim Biswas et al.

It is certified that error appears in the above-identified patent and that said Letters Patent is hereby corrected as shown below:

In the Specification

Column 5, Line 30, delete "and sucrose (>99.5%)" and insert therefor -- and sucrose (≥99.5%) --.

Column 13, Line 35, delete "refractive index ($m=m_{real}-m_{zing}i$)" and insert therefor -- refractive index ($m=m_{real}-m_{img}i$) --.

Column 13, Line 37, delete "mass concentration (m)" and insert therefor -- mass concentration ($m_{total}$) --.

Signed and Sealed this
Eleventh Day of April, 2023

Katherine Kelly Vidal
*Director of the United States Patent and Trademark Office*